US009645700B2

(12) United States Patent
Tsai

(10) Patent No.: US 9,645,700 B2
(45) Date of Patent: *May 9, 2017

(54) AD-HOC WEB CONTENT PLAYER

(71) Applicant: Daniel E. Tsai, Atkinson, NH (US)

(72) Inventor: Daniel E. Tsai, Atkinson, NH (US)

(*) Notice: Subject to any disclaimer, the term of this patent is extended or adjusted under 35 U.S.C. 154(b) by 73 days.

This patent is subject to a terminal disclaimer.

(21) Appl. No.: 13/758,245

(22) Filed: Feb. 4, 2013

(65) Prior Publication Data
US 2013/0151351 A1   Jun. 13, 2013
US 2015/0370417 A9   Dec. 24, 2015

Related U.S. Application Data

(62) Division of application No. 11/942,876, filed on Nov. 20, 2007.

(60) Provisional application No. 60/866,635, filed on Nov. 21, 2006.

(51) Int. Cl.
G06F 3/0481 (2013.01)
G06Q 30/02 (2012.01)
G06F 17/30 (2006.01)

(52) U.S. Cl.
CPC ...... G06F 3/0481 (2013.01); G06F 17/30905 (2013.01); G06Q 30/0275 (2013.01)

(58) Field of Classification Search
CPC .... G06F 9/4446; G06F 3/0481; G06F 3/1454; G06F 8/65; G06F 17/30905; G01C 21/367; G06Q 30/0275
USPC .................................. 715/714, 716
See application file for complete search history.

(56) References Cited

U.S. PATENT DOCUMENTS

| | | | | |
|---|---|---|---|---|
| 5,907,323 A | * | 5/1999 | Lawler et al. | 725/41 |
| 5,969,283 A | * | 10/1999 | Looney et al. | 84/609 |
| 6,104,334 A | * | 8/2000 | Allport | G06F 1/1626 340/12.28 |
| 6,199,076 B1 | * | 3/2001 | Logan et al. | 715/203 |
| 6,272,078 B2 | * | 8/2001 | Yankowski | 369/30.28 |
| 6,587,127 B1 | * | 7/2003 | Leeke et al. | 715/765 |
| 6,882,299 B1 | * | 4/2005 | Allport | H04N 21/8186 341/176 |
| 7,043,477 B2 | * | 5/2006 | Mercer et al. | |
| 7,305,483 B2 | * | 12/2007 | Yao et al. | 709/231 |
| 7,308,487 B1 | * | 12/2007 | Dansie et al. | 709/219 |
| 7,506,260 B2 | * | 3/2009 | Wada | G06F 17/30899 715/700 |
| 7,516,213 B2 | * | 4/2009 | Cunningham et al. | 709/224 |
| 7,526,588 B1 | * | 4/2009 | Schubert et al. | 710/105 |
| 7,590,656 B2 | * | 9/2009 | Plastina et al. | |

(Continued)

OTHER PUBLICATIONS

Secrets of RSS (book by Steven Holzner, pub date: Jun. 7, 2006).*

Primary Examiner — Jung-Mu Chuang
(74) Attorney, Agent, or Firm — Fish & Richardson P.C.

(57) ABSTRACT

A system for dynamically playing information using conventional feeds and ad-hoc feeds to produce "playable" content includes a device that executes a player engine, the player engine collecting, combining and sequencing items to play based on selection criteria and device context, of text, image, video content by parsing selective tags, patterns, text, identifiers and resource types of interest on resources such as web pages to produce playable content, storing the playable contents results from parsing in a queue of playable feed items, selecting items from the queue to produce an ad-hoc feed and playing the ad-hoc feed.

57 Claims, 24 Drawing Sheets

(56) References Cited

U.S. PATENT DOCUMENTS

| Patent/Pub No. | | Date | Inventor | Class |
|---|---|---|---|---|
| 7,599,610 | B2* | 10/2009 | Benyamin | G11B 19/025 369/30.08 |
| 7,610,394 | B2* | 10/2009 | Katinsky et al. | 709/231 |
| 7,668,438 | B2* | 2/2010 | Fu et al. | 386/200 |
| 7,680,824 | B2* | 3/2010 | Plastina | G06F 17/30026 707/737 |
| 7,757,182 | B2 | 7/2010 | Elliott et al. | 715/779 |
| 7,774,799 | B1 | 8/2010 | Sellers et al. | 719/329 |
| 7,778,980 | B2* | 8/2010 | Bodin et al. | 707/693 |
| 7,788,586 | B2* | 8/2010 | Brownell | 715/727 |
| 7,818,659 | B2* | 10/2010 | Kahn et al. | 715/203 |
| 7,840,527 | B2* | 11/2010 | Kahn et al. | 707/608 |
| 7,844,215 | B2* | 11/2010 | Vance | G06Q 30/02 455/3.06 |
| 7,865,511 | B2* | 1/2011 | Kahn et al. | 707/758 |
| 7,865,830 | B2* | 1/2011 | Kim et al. | 715/713 |
| 7,900,131 | B2* | 3/2011 | Kahn et al. | 715/205 |
| 8,036,934 | B2* | 10/2011 | Mankoff | G06F 17/30011 700/90 |
| 8,060,830 | B2* | 11/2011 | Kahn et al. | 715/760 |
| 8,078,603 | B1 | 12/2011 | Chandratillake et al. | 707/706 |
| 8,150,840 | B2* | 4/2012 | Nachman | 707/722 |
| 8,185,543 | B1 | 5/2012 | Choudhry et al. | 707/767 |
| 8,200,775 | B2 | 6/2012 | Moore | 709/217 |
| 8,285,595 | B2* | 10/2012 | Svendsen | 705/26.1 |
| 8,332,478 | B2* | 12/2012 | Levy et al. | 709/217 |
| 8,412,763 | B2* | 4/2013 | Jones et al. | 709/201 |
| 8,427,671 | B2* | 4/2013 | Sato et al. | 358/1.15 |
| 8,516,035 | B2* | 8/2013 | Neumann et al. | 709/203 |
| 8,549,097 | B2* | 10/2013 | Katinsky et al. | 709/217 |
| 8,549,410 | B2* | 10/2013 | Hoyle | 715/745 |
| 8,549,411 | B2* | 10/2013 | Hoyle | 715/745 |
| 8,621,531 | B2* | 12/2013 | Casey et al. | 725/87 |
| 8,631,029 | B1 | 1/2014 | Amacker | |
| 8,752,094 | B2* | 6/2014 | Kunkel et al. | 725/52 |
| 2002/0036655 | A1* | 3/2002 | Yulevich et al. | 345/744 |
| 2002/0069218 | A1* | 6/2002 | Sull et al. | 707/501.1 |
| 2002/0073179 | A1* | 6/2002 | Mackintosh et al. | 709/219 |
| 2002/0078456 | A1* | 6/2002 | Hudson | G06F 17/30017 725/60 |
| 2002/0157103 | A1* | 10/2002 | Song et al. | 725/97 |
| 2003/0020671 | A1 | 1/2003 | Santoro | |
| 2003/0033161 | A1* | 2/2003 | Walker | G06Q 10/10 705/1.1 |
| 2003/0041110 | A1* | 2/2003 | Wenocur | G06Q 10/107 709/206 |
| 2003/0137531 | A1* | 7/2003 | Katinsky | G06F 17/30053 715/716 |
| 2003/0182315 | A1* | 9/2003 | Plastina | G06F 17/30749 |
| 2004/0001106 | A1* | 1/2004 | Deutscher et al. | 345/838 |
| 2004/0015398 | A1* | 1/2004 | Hayward | 705/14 |
| 2004/0103227 | A1* | 5/2004 | Hunter | H04N 7/18 710/65 |
| 2004/0268261 | A1* | 12/2004 | Elliott et al. | 715/716 |
| 2005/0021470 | A1* | 1/2005 | Martin et al. | 705/51 |
| 2005/0080878 | A1* | 4/2005 | Cunningham | G06Q 30/02 709/219 |
| 2005/0160111 | A1* | 7/2005 | Plastina | G06F 17/30035 |
| 2005/0183017 | A1* | 8/2005 | Cain | G06F 8/38 715/719 |
| 2005/0193010 | A1* | 9/2005 | DeShan et al. | 707/104.1 |
| 2005/0198220 | A1* | 9/2005 | Wada | G06F 17/30899 709/220 |
| 2006/0069797 | A1* | 3/2006 | Abdo et al. | 709/231 |
| 2006/0129916 | A1* | 6/2006 | Volk | G06F 17/2247 715/201 |
| 2006/0143236 | A1* | 6/2006 | Wu | G06F 17/30053 |
| 2006/0143647 | A1* | 6/2006 | Bill | G06F 17/30743 725/10 |
| 2006/0167860 | A1* | 7/2006 | Eliashberg et al. | 707/3 |
| 2006/0173985 | A1* | 8/2006 | Moore | G06F 17/3089 709/223 |
| 2006/0248209 | A1* | 11/2006 | Chiu et al. | 709/231 |
| 2006/0277457 | A1* | 12/2006 | Salkind et al. | 715/512 |
| 2006/0277460 | A1* | 12/2006 | Forstall et al. | 715/513 |
| 2006/0288111 | A1* | 12/2006 | Katinsky et al. | 709/228 |
| 2007/0016609 | A1* | 1/2007 | Kim et al. | 707/104.1 |
| 2007/0022438 | A1* | 1/2007 | Arseneau et al. | 725/45 |
| 2007/0038672 | A1* | 2/2007 | Plastina et al. | 707/104.1 |
| 2007/0038712 | A1* | 2/2007 | Affronti | G06Q 10/06 709/206 |
| 2007/0043766 | A1* | 2/2007 | Nicholas | H04L 67/02 |
| 2007/0050446 | A1* | 3/2007 | Moore | G06F 8/36 709/203 |
| 2007/0050458 | A1* | 3/2007 | Rotzoll et al. | 709/206 |
| 2007/0057775 | A1* | 3/2007 | O'Reilly et al. | 340/309 |
| 2007/0061487 | A1* | 3/2007 | Moore | G06F 17/30575 709/246 |
| 2007/0077921 | A1* | 4/2007 | Hayashi et al. | 455/414.1 |
| 2007/0078713 | A1* | 4/2007 | Ottt et al. | 705/14 |
| 2007/0083897 | A1* | 4/2007 | Brownell | 725/61 |
| 2007/0088727 | A1* | 4/2007 | Kindig | 707/101 |
| 2007/0094076 | A1* | 4/2007 | Perkowski | G06Q 30/02 705/14.51 |
| 2007/0094156 | A1* | 4/2007 | Isaacs | 706/2 |
| 2007/0118873 | A1* | 5/2007 | Houh et al. | 725/136 |
| 2007/0156726 | A1* | 7/2007 | Levy | 707/100 |
| 2007/0168354 | A1* | 7/2007 | Ramer | G06F 17/30749 |
| 2007/0186179 | A1* | 8/2007 | Williams | G06F 3/0224 715/771 |
| 2007/0192352 | A1* | 8/2007 | Levy | 707/102 |
| 2007/0204322 | A1* | 8/2007 | Whyte | G03B 21/00 725/146 |
| 2007/0213857 | A1* | 9/2007 | Bodin et al. | 700/94 |
| 2007/0226734 | A1* | 9/2007 | Lin et al. | 717/177 |
| 2007/0239611 | A1* | 10/2007 | Blum | G06F 17/30749 705/51 |
| 2007/0291404 | A1* | 12/2007 | Morse et al. | 360/81 |
| 2007/0299873 | A1* | 12/2007 | Jones et al. | 707/104.1 |
| 2008/0021777 | A1* | 1/2008 | Mack et al. | 705/14 |
| 2008/0086689 | A1* | 4/2008 | Berkley | G06F 17/30896 715/731 |
| 2008/0092158 | A1* | 4/2008 | Bhatnagar et al. | 725/34 |
| 2008/0111822 | A1* | 5/2008 | Horowitz | H04N 21/8126 345/530 |
| 2008/0134258 | A1* | 6/2008 | Goose | H04N 7/17336 725/91 |
| 2008/0288874 | A1* | 11/2008 | Hoyle | 715/738 |
| 2008/0301317 | A1* | 12/2008 | Lee et al. | 709/231 |
| 2009/0076881 | A1* | 3/2009 | Svendsen | 705/10 |
| 2009/0132349 | A1* | 5/2009 | Berkley | G06F 17/30896 715/202 |
| 2009/0210415 | A1* | 8/2009 | Martin et al. | 707/5 |
| 2009/0222392 | A1 | 9/2009 | Martin | |
| 2009/0239573 | A1 | 9/2009 | Kretz | |
| 2009/0240586 | A1* | 9/2009 | Ramer | G06F 17/30905 705/14.64 |
| 2010/0076994 | A1* | 3/2010 | Soroca | G06F 17/30749 707/769 |
| 2010/0161091 | A1 | 6/2010 | Takatsuka | |
| 2011/0164056 | A1 | 7/2011 | Ording | |
| 2013/0191749 | A1 | 7/2013 | Coburn, IV | |
| 2013/0254207 | A1* | 9/2013 | Coburn, IV | G06F 3/01 707/740 |

* cited by examiner

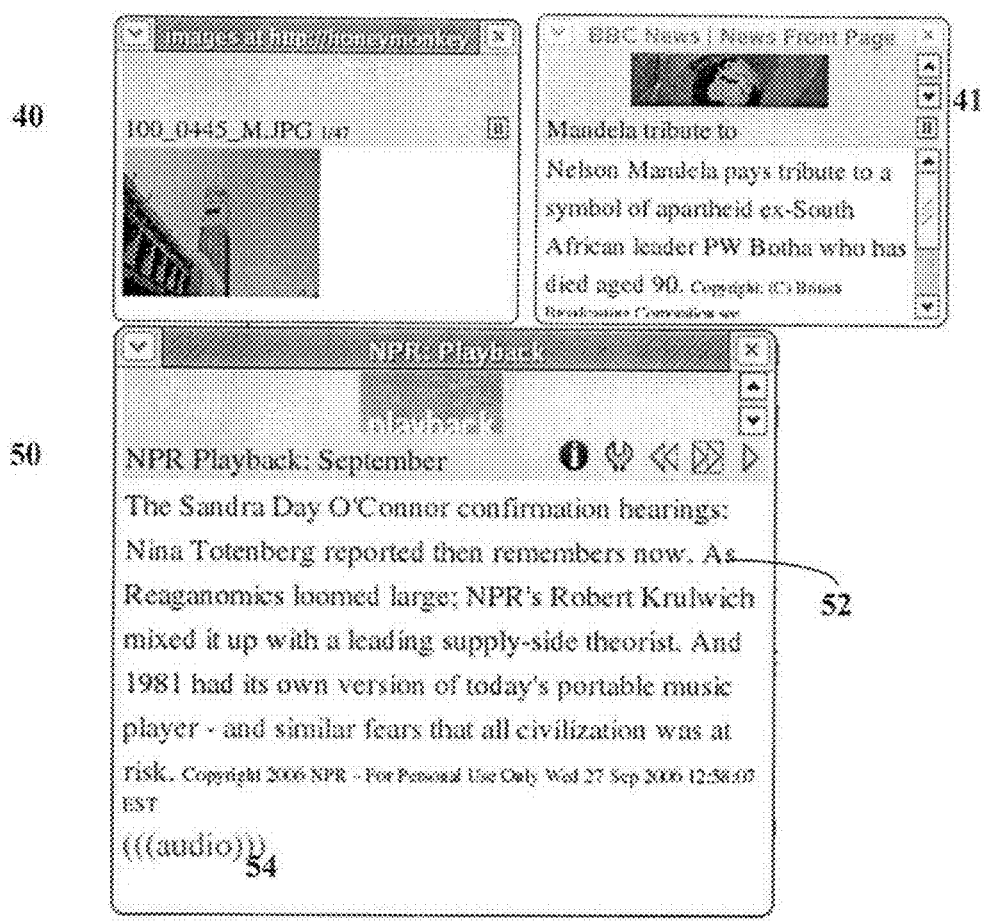

```
1   xmlns:uact="http://example-user-interaction-names-space.com/spec"                        161
2   <uact:comments server="http://honeymonkey.com/comment-svr/" id="213"                     162
    />
         163
3   <uact:coupon id="3006001b" server="http://honeymonkey.com/coupon-
    svr/" >                              176                                          177
      <uact:coupon-title>Buy 1 get 1 free</uact:coupon-title> 173
      <uact:coupon-valid-until>12/1/2006</uact:coupon-valid-until> 174          170
      <uact:coupon-restrictions>one per household</uact:coupon-
    restrictions>                                                              175
    </uact:coupon>        181
4   <uact:call number="555-2222" title="snack sales department" />                    180
5   <uact:reservation server="http://honeymonkey.com/cafe/reservation-
    svr">                                                                              192
      <uact:reservation-title>Treehouse Café</uact:reservation-title>
      <uact:reservation-send name="party_name" />                                      190
      <uact:reservation-send name="party_number" />
      <uact:reservation-send name="time" />              } 191
      <uact:reservation-send name="phone_number" />
      <uact:reservation-send name="special_requests" />
    </uact:reservation>
6   <uact:quickreply server="http://honeymonkey.com/replies/" id="222">
      <uact:quickreply-question>Do you like sweet, hot or super spicy?              200
      </uact:quickreply>
      <uact:quickreply-option>sweet</uact:quickreply-option>
      <uact:quickreply-option>hot</uact:quickreply-option>
      <uact:quickreply-option>super spicy</uact:quickreply-option>
      <uact:quickreply-type-msg/>
    </uact:quickreply>
7   ...
    <item>                                                                             210
      <title>Spicy Mango Chutney</title>
      <description>My mango chutney comes in sweet, spicy and super
    spicy. It is yummy as a dip or with meat</description>
      <uact:comments server="http://honeymonkey.com/comment-svr/"
    id="213" />        211
    </item>
    ...
8   ...
    <item>                                                                             220
      <title>Treehouse Café</title>
      <description>Coffee, hot cocoa, cakes, pies, cookies, and cool
    atmosphere</description>
223   <uact:reservation
    spec="http://honeymonkey.com/cafe/reservations.xml"/>
    </item>                      224
    ...
```

```
<!-- ITEM TITLES -->
        function load_item_title(){
          var item_title_array = new Array();
          <xsl:apply-templates select="rss/channel/item/title"/>
    321   <xsl:apply-templates select="atom:feed/atom:entry/atom:title"/>
          <xsl:apply-templates select="rdf:RDF/rss1:item/rss1:title"/>
//        alert(item_title_array.join('\n'));
          return item_title_array;
        }
```

📄 100_0466_M.JPG    342
📄 100_0466_M.txt    343

A view of The Church of San Giorgio Maggiore, from across the lagoon. The tower is undergoing restoration.

📄 100_0467_M.JPG    342
📄 100_0467_M.xml    344

```
<author>dan@honeymonkey.com</author>    345
<title>San Marco</title>
<description>View of San Marco from a vaporetto going towards San Giorgio</description>
```

AD-HOC WEB CONTENT PLAYER

This application is a divisional (and claims the benefit of priority under 35 U.S.C. §121) of U.S. application Ser. No. 11/942,876, filed Nov. 20, 2007, which claims priority from U.S. application Ser. No. 60/866,635, filed Nov. 20, 2006. The disclosure of the prior application is considered part of (and is incorporated by reference in) the disclosure of this application.

BACKGROUND

This invention relates to techniques for accessing and interacting with information in particular content that is accessible over the Internet.

The Internet affords a large mixture of content, most often presented as web pages, a page-sized formatted document with text, images, other media, and hyperlinks. Browsing the Internet usually involves accessing a web page and clicking on hyperlinks to arrive at an linked web page. Information is presented to the user in chunks of "pages" that require typing of search terms or addresses (URLs) and clicking on hyperlinks.

A feed is a dataset, not inherently formatted or suitable for direct user access. Feed readers are used to search through feeds provided by web sites. Feeds can also be viewed as a web page, formatted by web-based feed services.

SUMMARY

While browsing the web, a form of navigation of content, involves starting at a web page and moving to other content by clicking on hyperlinks to open other web resources, in some situations, this technique of receiving information is difficult or undesired. First, small devices such as cell phones and person digital assistants (PDA's) that are now able to browse the web are not well suited for this type of navigation. Because, control of small devices, including clicking and typing is limited and difficult for many users. In addition, large public displays such as kiosks and large flat panel displays can be hooked up to the web but often cannot or do not allow browsing input by the user, even though changing, dynamic content would be appropriate. Further, desktop and laptop computer users may want to see a large assortment of information but do not have the time or desire to click to various pages to see this information, especially if the information changes often, thus needing re-visiting.

According to an aspect of the invention a system includes a processor, a display, and a memory executing a computer program for dynamic playback of information from conventional feeds and ad-hoc feeds. The computer program product includes instructions to cause the processor to produce "playable" content from ad-hoc feeds, manage a queue of queue items of playable content that includes playable content from the ad-hoc feeds, play the queued items by cycling through queued items in the queue according to criteria specified for play back of the content and render a player window on the display of the system to display the playable content in at least one player window.

The following are embodiments within the scope of the claims.

The single or simultaneous, asynchronous players run on the device, each having play engines that cycle through the queued items. The items can be played without interaction. The items syndication feeds, podcast feeds and web folders of images. The system includes a set of interaction tools to facilitate interaction with the queued items, as the queued items are played, and to perform operations on the played item. The interactions include at least one of to make comments, to purchase an item, to make a call, and to make a reservation. The system includes a module to transform content into ad-hoc feeds. The player is integrated into a browser and is available at any time to load feeds during browsing. The player is a site-tool for playing products on an e-commerce site. The play engine includes a promo box that provides quick links to playable content, where a link in the promo box can be clicked on and a player loaded immediately, as opposed to having to drag-and-drop content from a browser page. Sponsored messages, links, and advertisement are shown in the promo box to generate revenue and providing additional content. The user controls the type of information sent to their promo box, by topic location, time, audience, activity, and other properties.

According to an additional aspect of the invention, a method executed on a device, the method includes receiving playable feeds of content, dynamically playing the content by queuing items comprising playable content and cycling through the queued items to play the content.

The following are embodiments within the scope of the claims.

The playable content includes ad-hoc feeds and the method includes converting the ad-hock feeds to produce the playable content.

According to an additional aspect of the invention, a computer implement method of generating revenue from promotions, the method includes offering promotion slots by set price and time requirements and running the promotions in a round robin sequence or a sequence based on user factors.

The following are embodiments within the scope of the claims.

The method reaches a large audience for a fixed or low cost. For a given sign-up period, fewer promotions get more play time. For a given sign-up period more promotions get less play time.

According to an additional aspect of the invention, a computer program product residing on a computer readable medium for playing content, the computer program product includes instructions for causing a device to queue items of playable content, execute a play engine that cycles through queued items to play the items, and provide interaction tools for items based on at least one of context of the user, device and location.

According to an additional aspect of the invention, a system for dynamically playing information using conventional feeds and ad-hoc feeds to produce "playable" content includes a device player that executes a player engine, the player engine collecting, combining and sequencing items to play based on selection criteria and device context, of text, image, video content by, parsing selective tags, patterns, text, identifiers and resource types of interest on resources such as web pages to produce playable content. The device also includes functionality for storing the playable contents results from parsing in a queue of playable feed items, selecting items from the queue to produce an ad-hoc feed and playing the ad-hoc feed.

The invention uses conventional feeds and ad-hoc feeds to provide "playable" content that are collected, combined, and sequenced for display. At regular user configurable intervals, e.g., every 5-10 seconds 20-40 seconds as well as other intervals, another item in the play sequence is shown. Conventional feeds are inherently summary in nature. Making "ad-hoc" feeds from web resources such as pages, images and media collections broadens the available playable contents. Combinations of content from many sources based on user preferences and device contexts, such as location, enhances the variety of such available content. The user need not interact with the device after play is started. The contents can cycle, automatically refreshing. Multiple play-screens can operate at the same time, presenting information as text, images, video and other media in parallel. Interaction occurs when the user selects an item of interest to the user.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 5A-5B are a series of popup player windows depicting various content types and a control pad.

FIG. 10G depicts supporting xml tags for the tools of FIGS. 10A-10F.

DETAILED DESCRIPTION

Described is a system for dynamic sharing of information using conventional feeds and ad-hoc feeds to produce "playable" content suitable for desktop computers, kiosks, and mobile devices. Playable content are items that include news, messages, products for sale, photos and other media, that is selected, sequenced, and shown in a concise manner. A play "engine" cycles through queued items of content. Users run single or simultaneous, asynchronous (i.e. independent) players. Items can be played without interaction by the user. However, an item of interest can be focused on, viewed in detail, and interacted with at the discretion of the user. Quick interaction tools facilitate interaction with an item to perform operations such as to view or make comments, purchase an item, make a call, make a reservation, or otherwise interact with an item in a defined manner. Such interactions can use the context and information of the item of interest, user preferences, and the device context to streamline interaction.

Ad-hoc feeds are web resources interpreted and transformed into "playable" feed-like content. The player is a client-tool that is integrated into a browser and be available at any time to load feeds during browsing. Alternatively, the player is a site-tool such as for playing products on an e-commerce site.

The player enables users to load and play feeds (e.g., RSS (Really Simple Syndication protocol), podcast feeds and other "playable" content (e.g. web folders of images). Playable content can be news, products for sale, services, announcements, images and other media, journals, and messages. For desktop computing uses, the played feed is asynchronous and independent of the main browser window, so the user can play content at the same time as browsing conventional web-page content. In mobile devices, "playing" content reduces the need for user interaction while providing dynamically changing content. This is particularly important on small mobile devices and when the user cannot devote much attention or fine motor control to the device. Playing can be stopped to focus on an item of interest at any time. A history of loaded feeds is automatically saved so the user can reload them again directly.

Feeds are datasets, usually stored in as extensible markup language (XML). There are various versions, but most have in common a title, description, and a set of news items, each with a title and description. Feeds do not inherently have a display format or interactivity. The Player uses feeds and other data to expand the current notion of "browsing."

Figure 1:
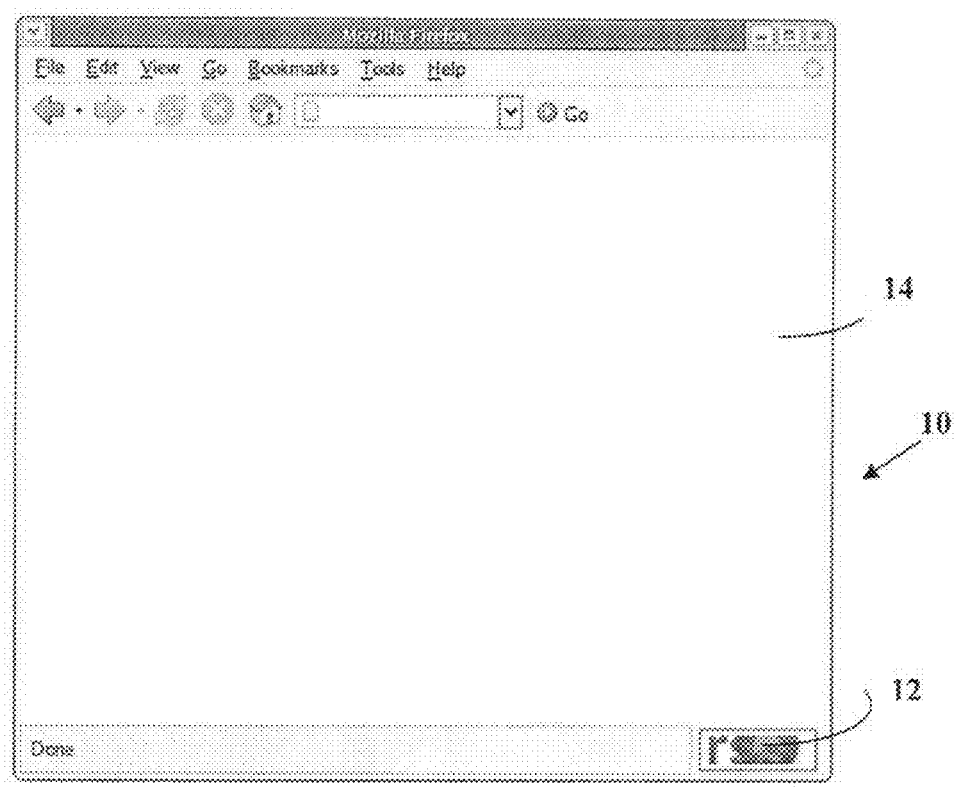
FIG. 1 is a diagram depicting a browser window having integrated player tool.

Referring to FIG. 1, an application 10 for launching a player 20 (FIG. 3) is shown comprised of an integrated extension 12 to a web browser 14 window. The integrated extension 12 is depicted as an icon on a toolbar or menu within the web browser 14. Described later in the document is a site-based version which is server-based instead of client-browser-based. The integrated extension 12 is available during browsing to load and play feeds as they are found.

Figure 2:
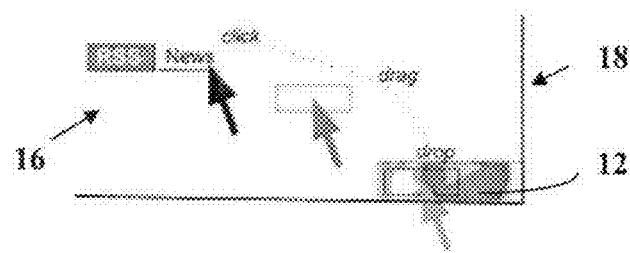
FIG. 2 depicts dragging and dropping a feed into the player tool

Referring to FIG. 2, as a user browses web pages that have links to feeds 16 often shown as orange "RSS", "XML", "Atom", "Pod" icons on such pages. A user drags and drops such feeds and other types of URL links onto the integrated extension 12 causing the application 10 to load and process the dragged and dropped linked contents, which results in playing of the feed in a small pop-up window 20 (FIG. 3).

Details of loading and conversion of these feeds are set out below in FIG. 14.

Figure 3:
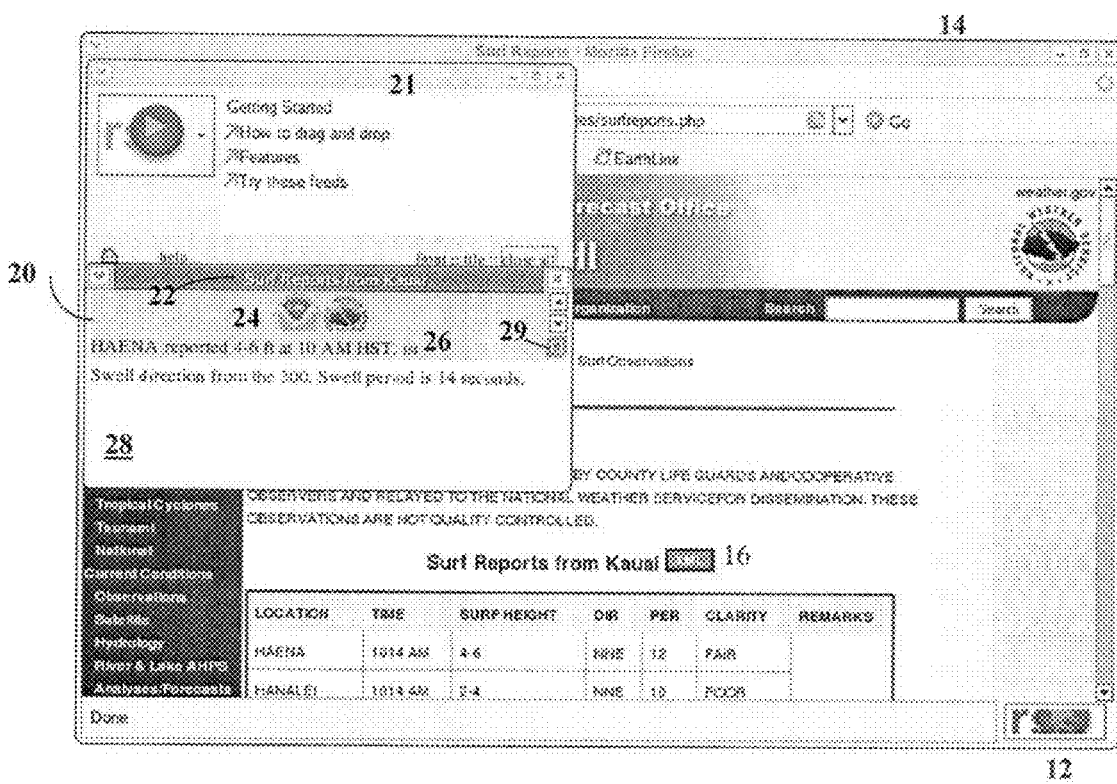
FIG. 3 depicts a feed loaded into a popup player window overlaid on the browser window of FIG. 1.

Referring to FIG. 3, dragging and dropping an "xml" 16 link onto the integrated extension 12 plays a feed about, e.g., "Surf Reports from Kaui." The feed title becomes a popup window 20 title 22. The feed image becomes a banner 24 to recognize its source. For each item shown, a title 26 appears linked to its source document. A description of the document 28 appears under the title 26. A small unobtrusive pause button 29 is shown during play, allowing the user to stop and control the player. The player window 20 operates independently of the main browser window 14, and can be viewed in parallel as the user continues to browse various web sites.

Figure 4:
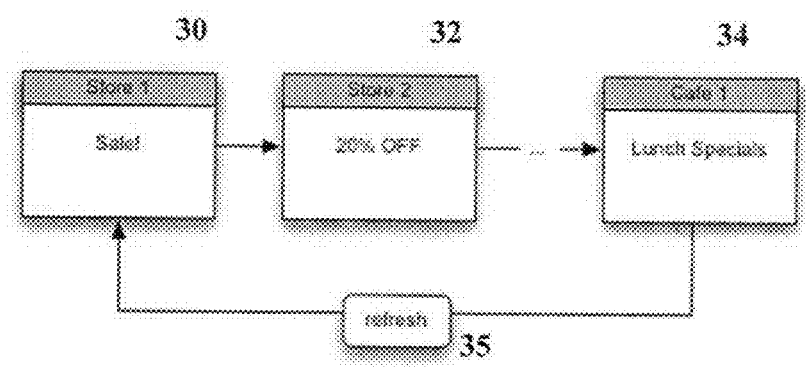
FIG. 4 depicts is a playing a sequence of feed items.

Referring now to FIG. 4, the items of content 30, 32, 34 to be played are sequenced and shown for a few seconds. Each "item" in the feed is shown in sequence. The sequence of items 30, 32, 34, "loop," allowing the user many opportunities to read the items. The contents of a played feed can be set to refresh 35, providing a new and changing set of items on display.

Figure 5A:

Referring now to FIG. 5, during the course of web browsing, many feeds 40, 42, 44, 46 can be launched and played, resulting in an array of players 20, each independently displaying content in timed sequences. These players 20 are independent of the main browser window, allowing the user to continue with conventional browsing, while also showing (playing) feed contents in a small, concise visual manner. For example, a user can be viewing weather reports 40 and 42, while viewing travel photos 44, news 41 and products for sale 46 from various feeds. At any point, an item that catches the user's attention can be jumped to by, e.g., clicking on the title. Each player and each item shown is distinguished by its source title, the source banner (if supplied), item title, and description. If each item has a publication date and author, this information is shown as well. Podcasts 50 are also a type of "feed" that can be shown. The description 52 of the podcast is shown and a link 54 to launch an audio player (not shown) is available. A sequence of podcasts can be shown and the viewer can pick the one(s) to launch (using an external application), even without pausing.

Figure 6:
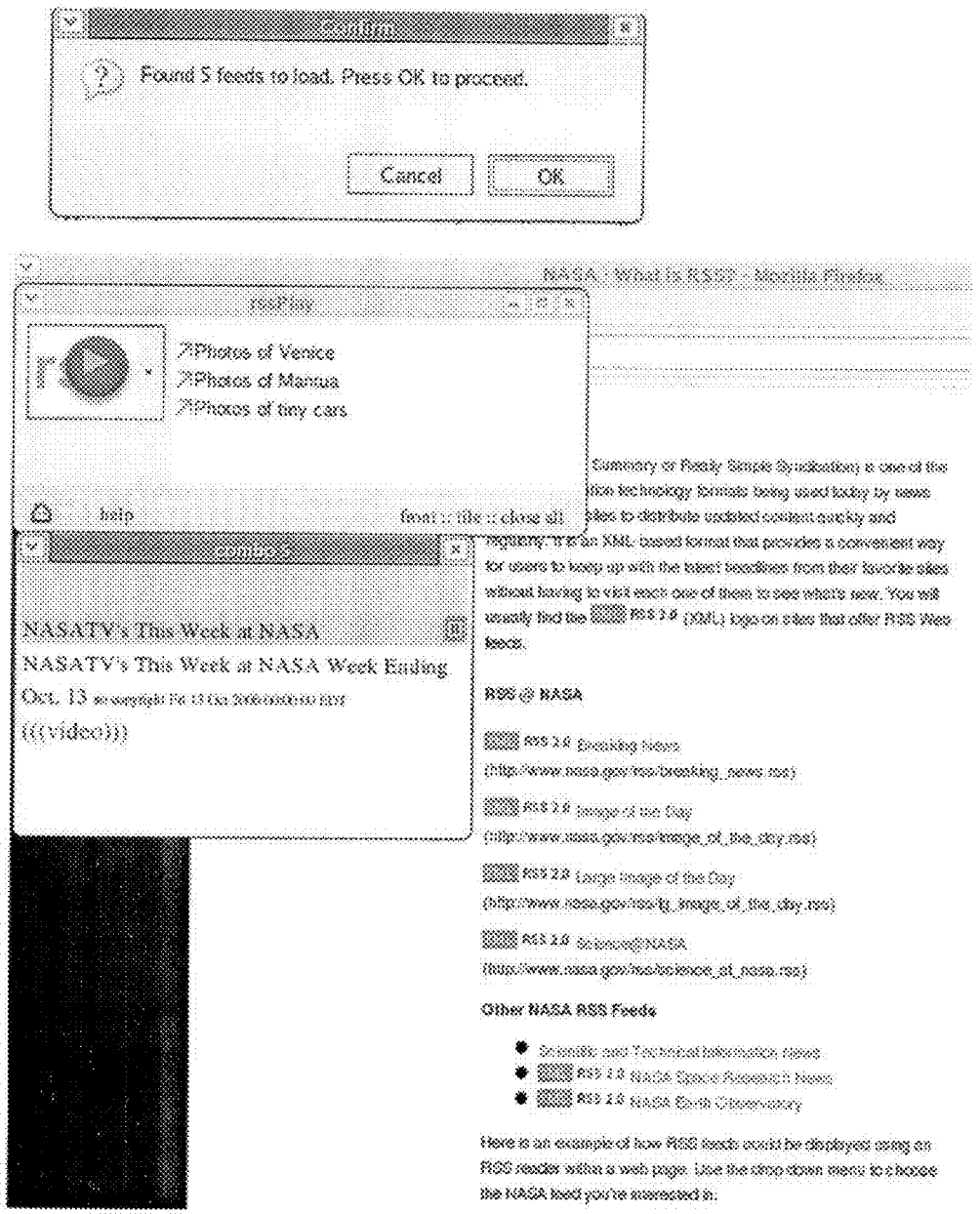
FIG. 6 is a diagram that depicts "Munching" of contents on a page into playable contents including a message to process feeds found and combined feeds playing.

Referring to FIG. 6, instead of many players, a single player can be used to combine all loaded feeds, either from one page or from various pages. Instead of individually selecting feeds to play from a page, all feeds on a page are found and combined together for playing. A web page is read by the player and parsed for content that are played, such as a directory of feeds, particular tagged contents, images, or text. Tagged content that is converted into playable content includes (for example) images (html "img src" elements), tagged text (such as html div tag elements), and feed links (html "link" elements, where rel="alternate" type="application/rss+xml"). Specific tags and patterns of tags and values can be used to identify content on pages to convert into "playable" content.

Figure 7:
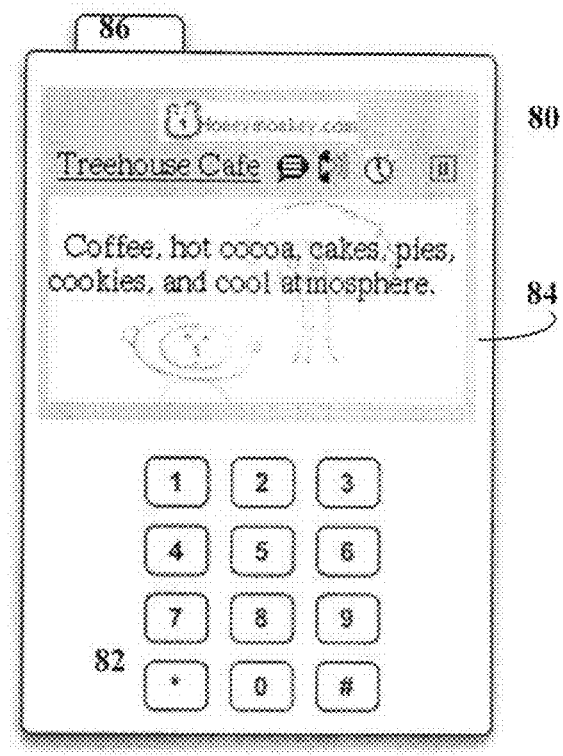
FIG. 7 depicts a portable device with a Player.

Combining feeds into one player window is useful when the user does not prefer many windows on the desktop, or when the user device is small and cannot visually support multiple windows. As shown in FIG. 7 a display in a cell phone 80 (or e.g., personal digital assistant (PDAs)) receives combined feeds. Users need not actively "browse" to receive new information. This is especially useful for small mobile devices, where small controls 82 may be difficult to use and are distracting.

Figure 8:
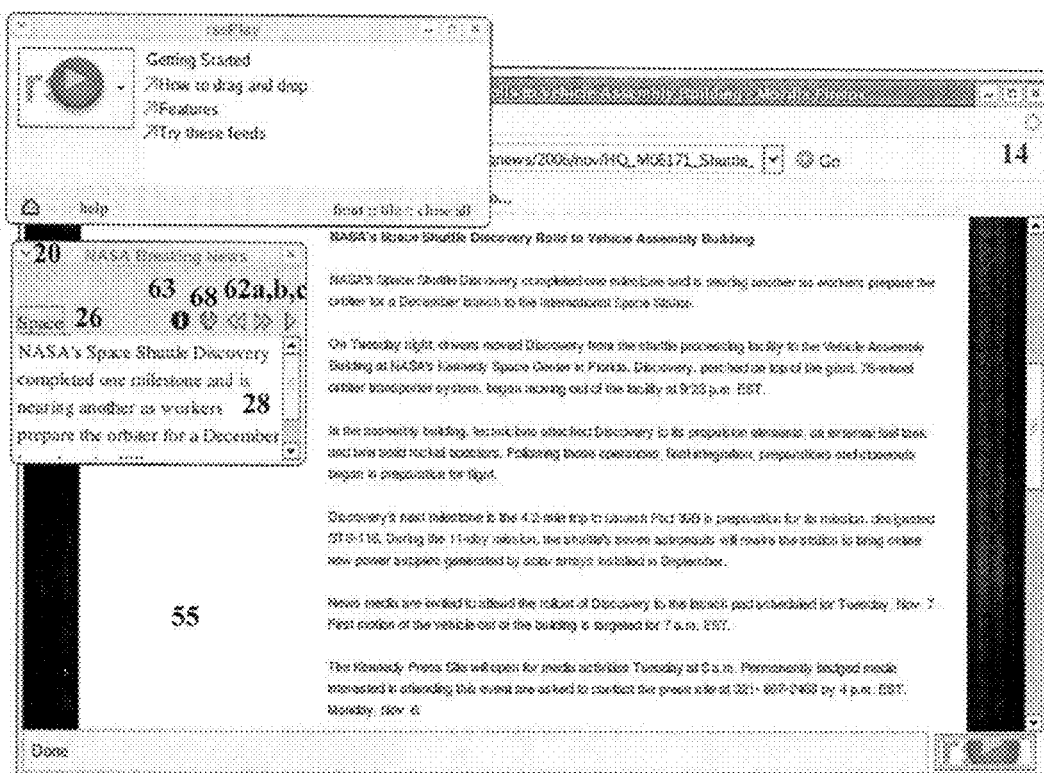
FIG. 8 depicts a Loading linked (title) source to main browser
Figure 9:
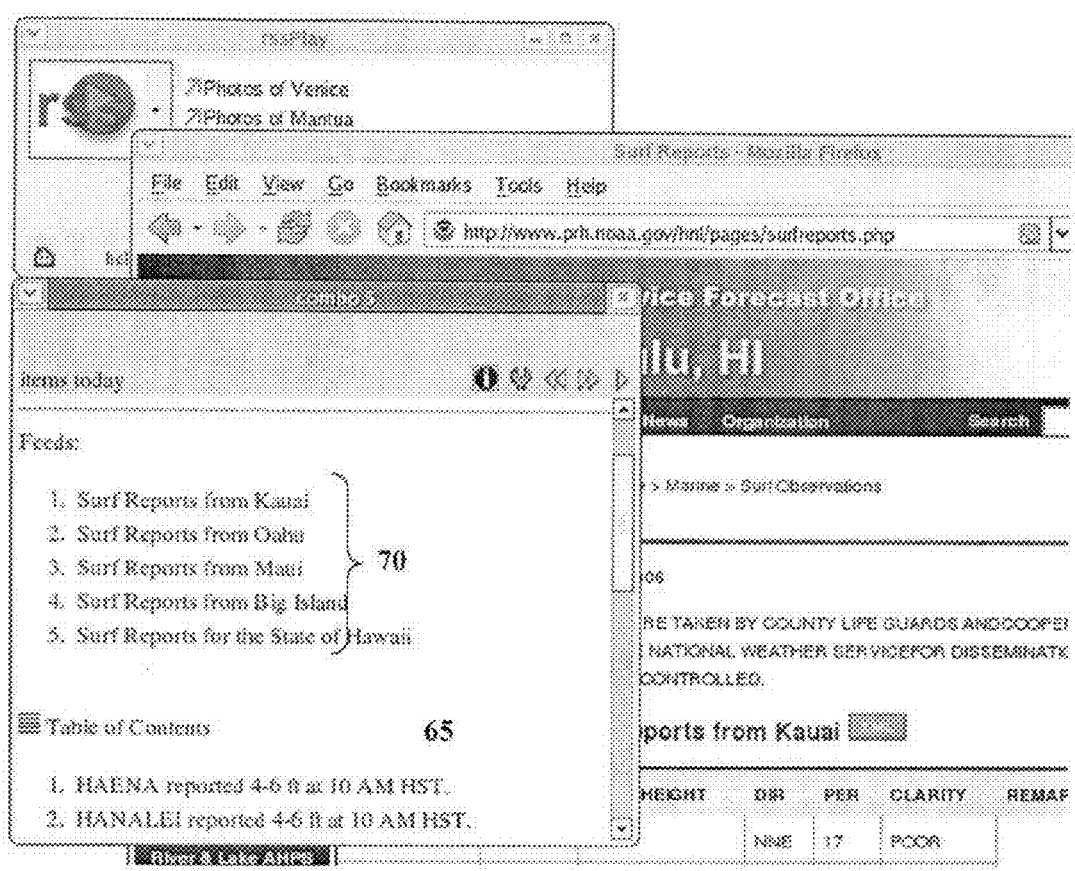
FIG. 9 depicts a Table of Contents for a combined play-list

Referring to FIG. 8, when a feed is playing, a pause button (not shown in FIG. 9, but as shown in FIG. 6B) is displayed in the navigational tool box. Each feed item is shown for a set number of seconds. The user pauses the play at any time by activating the pause button. The pause button is replaced by other buttons, e.g., forward 62a, backward 62b buttons to move sequentially through the items manually, a play button 62c to resume playing, an information button 63 to show the player's table of contents that lists the titles of each feed and the title of each item in the play-list and a setup button 68 to control settings for this player.

The Player has a table of contents that shows the title(s) of the feed(s), and the titles of each item in the play-list. The table of contents is accessed through the information "i" button 63 in the navigational controls. Clicking on the item's title 26 will show that item. Play resumes at that point or the item's title can be clicked to load the linked page. The title of each item is linked to the url link. Clicking on a title 26, either during play or pause will load the linked resource in a new window or in the main browser window Referring to FIG. 9, players that have combined sources show multiple feed titles 70 in the table of contents. All the feed items are listed 65 after. For combinations of sources in one Player, the format of the Player helps to distinguish each item's source by its banner and title.

Interactive Tools

Figure 10A:
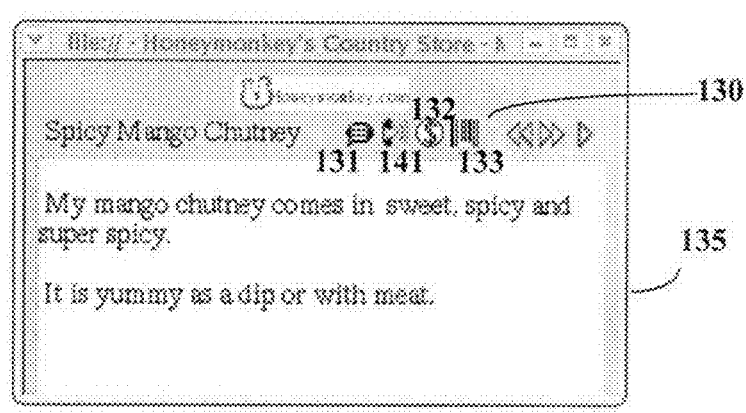
FIGS. 10A-10F are a series of diagrams that depict interactive tools

A player sequences and shows a series of items such as news, images, and video. Each individual item can be, for example, a weather report 40, photographs of travel places 44, or products for sale 46 (of FIG. 5). If the user is interested in a particular item, the player can be paused. The paused item has interactive tools that are relevant to the item as set out in (FIG. 10A, grouping of tools 130). For example, the product for sale 135 in FIG. 10A has a comment tool 131, a call tool 141, a transaction tool 132, and a coupon tool 133. These interactive tools can be part of the item definition (FIG. 10g) or built into the player application, or otherwise dynamically associated with the item. That is, an item, when paused, becomes a 'focused' item of interest. The device and user context can be brought to bear at that moment to offer relevant interactions.

Figure 10B:
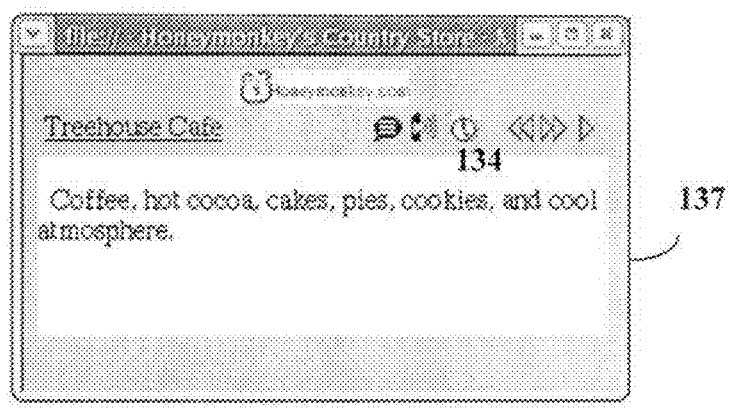
Figure 10C:
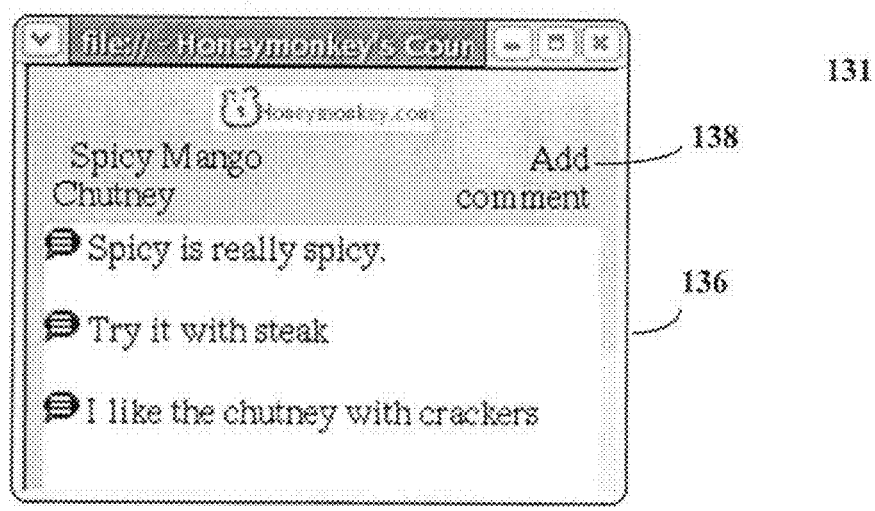
Figure 10D:
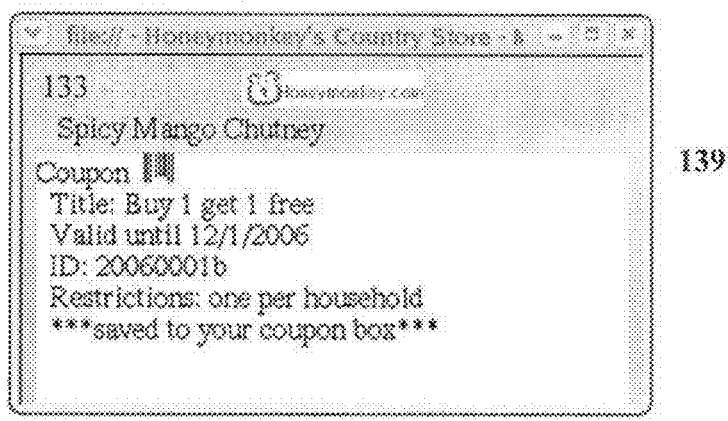

The coupon tool, for example, is an example of an interactive tool to provide users, such as shoppers, the ability to clip and save a coupon of interest (FIG. 10D). The data for the coupon is shown in FIG. 10G, grouping 170, which can be embedded with in a feed XML, within the coupon item, as extra tagged data. XML allows extensions to a given namespace, such as an RSS feed XML namespace), to other XML namespaces 161.

In this example, the feed has embedded extra data for the coupon. The player application, can detect the existence of the data and use the data if it has an appropriate interactive tool. A "tool" can be an icon 133 that is hyperlinked to a URL that leads to further processing of the interaction. For the coupon, the data specified a server URL 177, a coupon id 176, and coupon specific data 173, 174, 175. This data plus information about the user (the user preferences 450 and device context 451 of FIGS. 16 and 18) provide the necessary components of this interactive tool for this feed item.

Diverse interactions and accompanying tools can be produced in an open-ended fashion. The key is to provide custom interactivity relevant to the context of user, item, and device. The coupon tool is one such example, for a shopper. A dining reservation tool (FIGS. 10B and 10 F) is an example for a traveler and diner.

Referring to FIGS. 10A-10G, controls can include tools for quick interactions on an item, including a comments tool to show comments about the item, and make a comment about the item; a transaction button, to buy, sell, bid, or otherwise place a transaction in reference to the shown item; a clip tool to remember the particular item like a bookmark or clip more information such as with a coupon a reservation tool, to place a reservation if applicable; a call tool, to automatically contact the originator of the item; a quick response tool, such as to respond yes or no to a question.

Such tools may require additional information beyond that currently in standard feed items. Such information can be added with (xml) tags, as shown in FIG. 10G.

Comment-Tool

Referring to FIG. 10A and FIG. 10C, a comment tool 131 that permits quick interaction with devices such as mobile phones and personal digital assistants can aid in ease of use. As an item is displayed, such as one advertising a product 135 "Mango Chutney" (FIG. 10A) if it is of interest, the user pauses the play sequence and any quick-interaction tools available and relevant to the item are displayed. Tools can originate with an item or are associated to the item based on use-context. For example, selecting the comments tool 131, comments 136 can be shown for the item, based on an identifier, url, or other properties. The comments are retrieved on-demand from a comments server, and can reflect the preferences of the user to receive comments originating from oneself, known parties, or the general public. The user can add 138 a comment to the item, and likewise designate the audience who will see it.

Coupon-Tool

Referring to FIGS. 10A and 10D, an item of interest can be remembered in more sophisticated ways than just a bookmark. For example, a product item 135 might have a coupon 139 that has specific information related to the coupon. Feeds represented in XML format can have extended tags that define the specifications of a coupon 139, for example, and can be saved for later use. In this example, the product "Mango Chutney" has an offer title, an expiration date, a coupon id, and restrictions. This information can be saved by the user into a personal database and used at a later time, such as in a store to redeem a coupon automatically. The same user, with a mobile device receives feeds while the user is within a store. If the previously clipped coupon, matches with a product offering while shopping or at checkout the previously clipped (saved) coupon can be redeemed by the user.

Contact-Tool

Figure 10E:
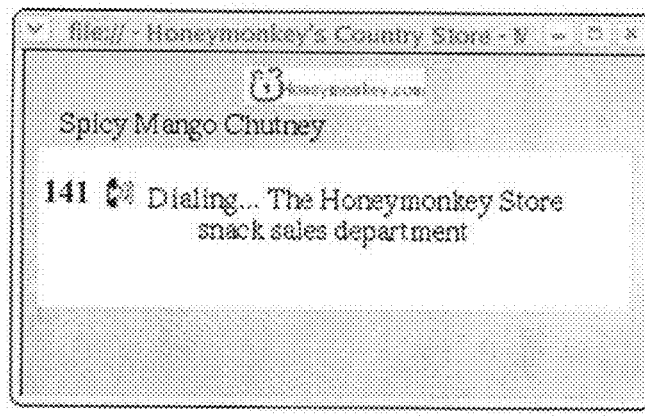
Figure 10F:
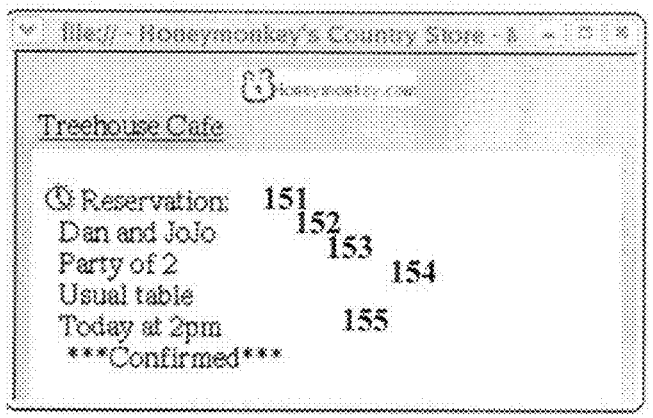

Referring to FIGS. 10A and 10E an item can have contact information such as a phone-number 140 embedded as an additional tag within the item. A call tool 141 can be used to contact the item's source by phone. This is particularly relevant for a player used within a mobile device such as a cell phone or PDA. The user can play items and pause on an item of interest, press the call button 141 to place a call. Interactions can have histories recorded, including items and parties called.

Reservation Tool

Referring to FIGS. 10B and 10 F, an enhancement to making a phone call is the reservation tool, 150 shown in the item for a café 137. Clicking on the reservation icon 151 initiates a request for a reservation by sending a message to a server that handles reservations for the café 137. User preferences for reservations can be used to fill in default reservation specifics, to minimize user entry during this process. For example, the names, 152, information about the number in a party 153, special requests 154 and time 155 can be general or even specific to a restaurant. This example tool 150 shows the use of a combination of personal information, stored within a device or personal account, and general information stored within a feed item to provide an interactive service.

Example Tags

Referring to FIG. 10g, user interactions can be embedded into feed items. In the example, an xml 160 namespace 161 distinguishes the tags from others. Example tags are shown for embedding interaction with an item for comments 162, coupons 170, calling 180, reservations 190, quick responses 200. The example coupon tag 170 has an identifier for the item 176, and a url to a server 177 that manages coupons. The coupon has nested details, such as a title 173, valid until date 174, and use restrictions 175, that are shown if the coupon is interacted with. This information or the unique reference to the id and server can be saved for later use 139. The call tag 180 simply has a number and a title 181, useful for a phone book as well. The reservation tag 190 has a url to the server 192 that will manage reservations for the particular place. The nested "reservation-send" tags 191 are "slots" to be filled by the reservation sender to request a reservation. This information may already be stored in user preferences on the client device or remote server and readily used without user entry.

An item such as a product for sale (FIG. 10A) is partially shown in xml FIG. 10G, as item 210, with additional comments tag 211 that specifies a server and id to retrieve comments from. Alternatively, the item's link can be used as a unique identifier to retrieve comments from servers. The comments do not have to be embedded within the item, but instead are dynamically retrieved on demand if the user initiates a comments interaction 131 with the item. Specifying more than one comments server (within the item or within user preferences) can provide a compilation of comments for an item.

The café item shown 137 of FIG. 10B has an reservation interactive tool 134. The item for a café 137 is partially shown in xml 220 (FIG. 10g) with an addition tag 223 for reservation interaction. Instead of embedding the entire reservation specification, the tag has a reference (url) 224 to it as a remote resource. This resource can be loaded if the user initiates such an interaction 134 for the item resulting in a reservation 150.

Player Control Pad

Figure 11:
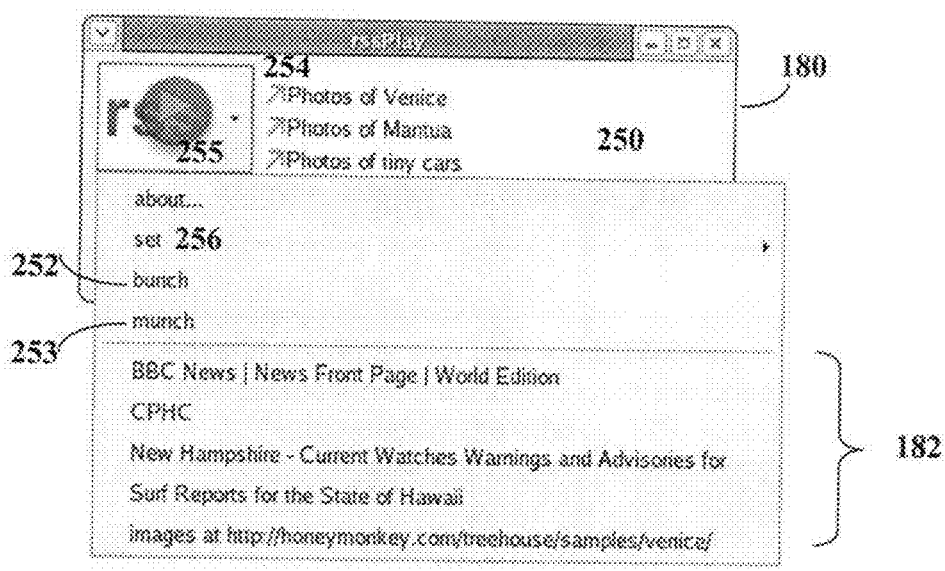
FIG. 11 depicts a control panel pull-down menu with sample history of visited feeds.

Referring to FIG. 11, the player control pad is a popup window 180 that accompanies the player windows. The control pad 180 has a menu-button that can be used to drag-and-drop content, as with the tool icon. The menu-button shows a menu of control-settings and a history of feeds 182. As a user plays feeds, the history of loaded feeds grows. The user can select a feed off this menu to play a feed again at a later session. The title of each feed is listed 182, usually in alphabetical order. If no title is available, the web URL is shown. Rolling over a title will also show the URL so that duplicate titles can be discerned. The history of feeds (and other played content) allows the user to browse and load playable content, then reload and re-play that content at a later time, with new data if available.

The control pad 180 has a menu feature 252 termed "munch" that refers to the parsing of a browsed page to produce a playable feed content. A page of images, for example, can be "munched" to form an "ad-hoc" slideshow feed. A page of titles and paragraphs can be "munched" to form an "ad-hoc" text feed, playable in the play-interface. The control pad 180 menu feature 253 termed "bunch" refers to the collecting of feeds into one playable content set. A page may have any number of feeds. Instead of selecting each one, "bunching" the feeds on a page produces a set of playable feed contents. Features bunch 252 and munch 253 act to select and combine web-based content in an ad-hoc manner suitable for playing.

Promo Box

Referring to back to FIG. 11, the promo box on the player control pad 180 is a small area 250 to show welcome messages to the user, and provide quick links to playable content. Links 254 in the promo box can be clicked on and a player loaded immediately, as opposed to having to drag-and-drop content from a browser page. Each time the player invokes the player tool, either by dragging and dropping a feed-link into the player-tool, or by simply clicking on it, the player control pad is opened and moved to the front of other windows, with an updated contents in the promo box.

Sponsored messages, links, and advertisement can also be shown in this small space, as a way of generating revenue and providing additional content. As an enhanced option, users may control the type of information sent to their promo box, by topic, location, time, audience, activity, and other properties.

Figure 12:
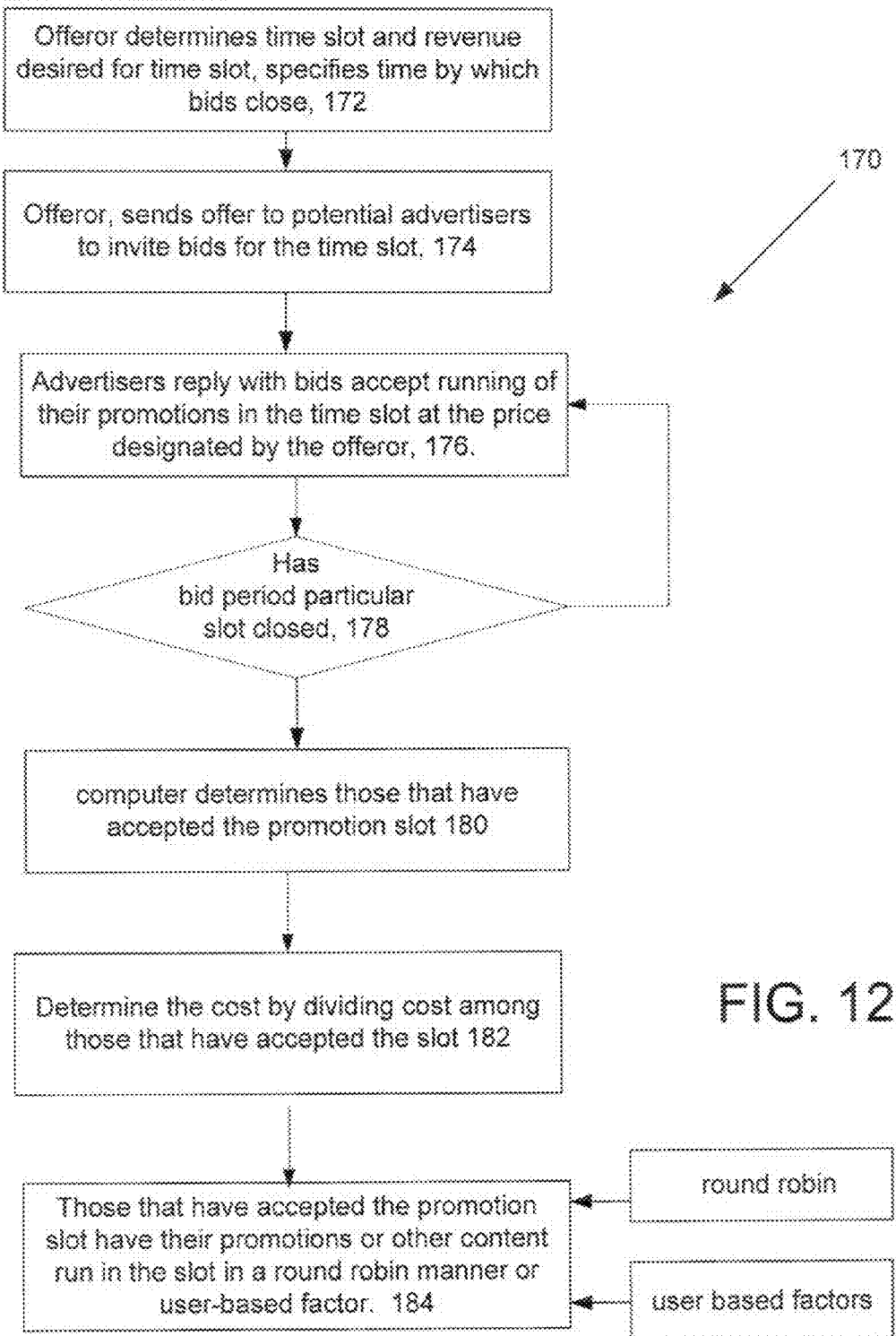
FIG. 12 is a flow chart depicting promotion handling.

Referring to FIG. 12A, a simple mechanism 170 to generate revenue from such promotions. A offeror, e.g., an entity that controls display of promotions in the player 10, sets, time slots, desired revenue, and a time by which potential bidders must reply 172. Offeror sends 174 invitations for bids for the promotion slot by a set price and a set time, such as for a given day at a given time for a fixed price. Advertisers respond with bids for the slot 176. If the bid period for the time has lapsed, the bid period is closed 178. The process determines 180 who signed on and cost for those signed on based on 182 the number of those that have signed on and the target revenue. At the time slot, the promotions are run 184 in either a round robin sequence or based on user factors for those that had signed up.

With process 170, users can sign on to accept a time slot at the price set by the offeror for running their promotions. After the period of time has elapsed for closing acceptance for a particular slot, the computer will determines those who have accepted the promotion slot. Those that have accepted the promotion slot have their promotions or other content run in the slot in a round robin manner or user-based factor. The cost is shared among those that have accepted the slot. If many users have accepted the slot, their promotions will be displayed in round robin or user based factors to the audience that exists during that slot, whereas if few or may be, e.g., one has accepted the slot, the user's promotions will be displayed to the audience for the entire slot period. The advantage to such a technique is the possibility of reaching a very large audience for a fixed, relatively low cost, because for a given sign-up period, the fewer the number of promotions the more those promotions get more play time. In contrast, the more the number of promotions the less play time each promotion receives.

Figure 13:
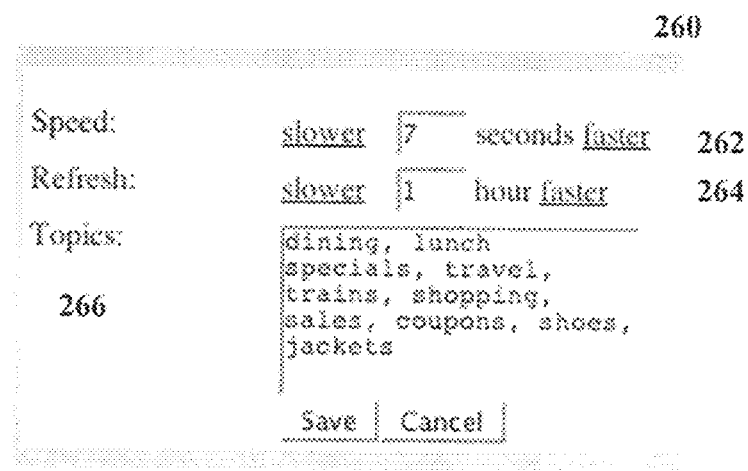
FIG. 13 depicts a player settings window.

Referring to FIG. 13, control settings 260 allow the user to set defaults for the popup window size, play speed 262, and refresh period 264. The history can be cleared or exported to a web page for saving or sharing. Players are set to a default refresh cycle 264. This time interval can be set by the user. Feeds have varying time intervals where they are updated by their owner/servers, mostly varying in hours. However, as the medium gets used more, dynamic feeds may change much more frequently.

Items can be selected by specifying selection criteria such as keywords 266 in item titles, descriptions, or categories. This can be further enhanced by the use of additional tags within an item and personal preferences. Selection could remove items from a play-list or re-prioritize the sorting of the play-list. Shown are a list of topics, but this could be more specific, including sources, authors, specific tags or attributes and values.

Figure 14:
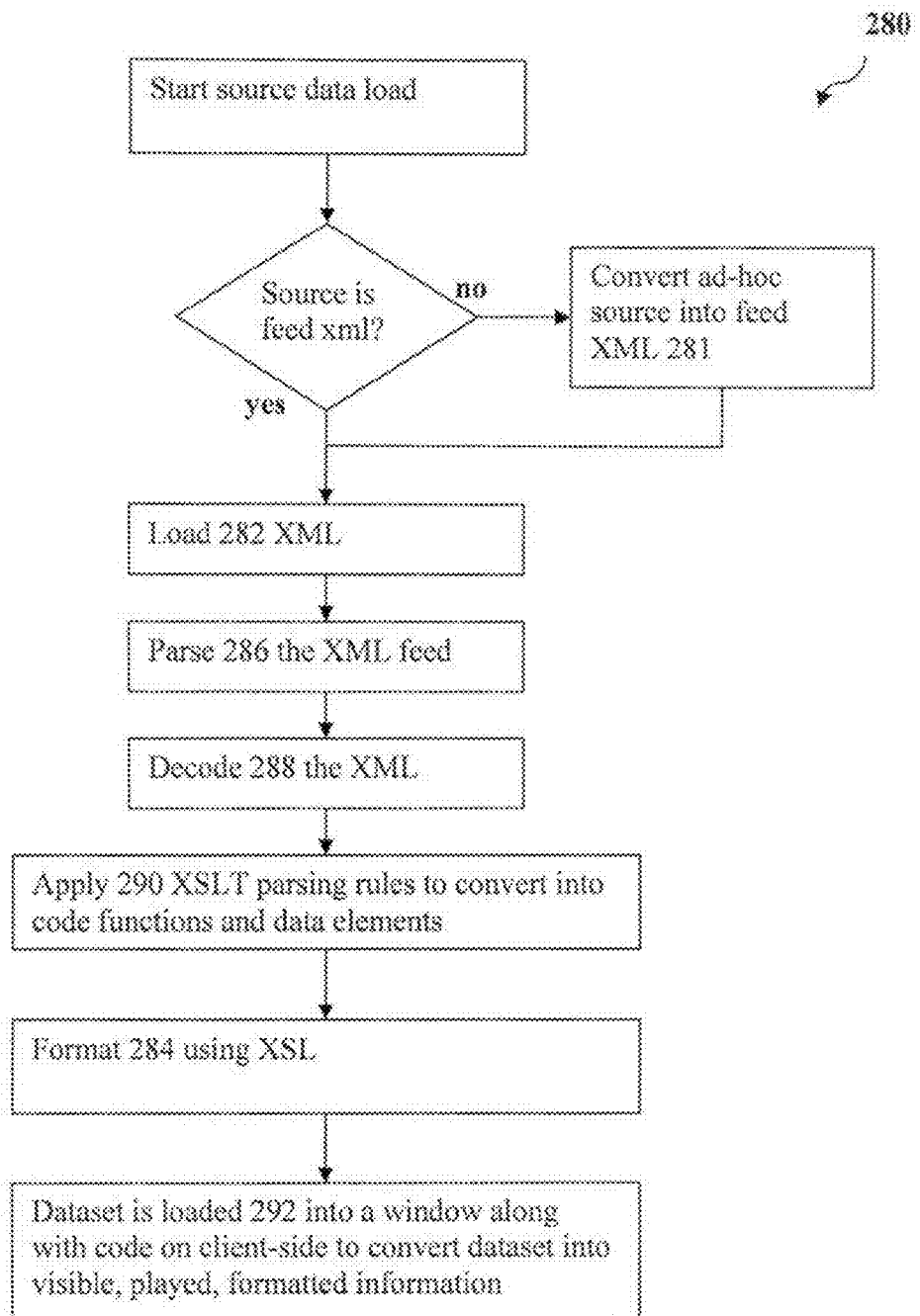
FIG. 14 is a flow chart depicting player operation.

Referring to FIG. 14, feeds currently are supplied as XML files in various formats such as RSS 2.0 and RSS 0.9. A transformation process 280 transforms these files into playable content for the player 10. The player 10 loads 282 the XML file and translates the XML file into a playable dataset, using XSLT. XLST is a language for transforming XML documents into other documents. XSLT is for use as part of XSL, which is a stylesheet language for XML. The document can be formatted 284 using XSL. That is, in addition to XSLT, XSL includes an XML vocabulary for specifying formatting. XSL specifies styling of an XML document by using XSLT to describe how the document is transformed into another document that uses the formatting vocabulary.

The transformation process 280 determines if the source data is a feed in XML. If not, then it is an ad-hoc source that needs to be converted 281 into a feed in XML. The XML is loaded 282, then the process parses 286 the XML feed, and decodes 288 its format. The transformation process 280 applies 290 XSLT parsing rules to convert the feed into code functions and data elements. The dataset 292 is loaded into a window along with code on the client-side to convert the dataset into visible, played, formatted information.

Figures 14A, 14B:
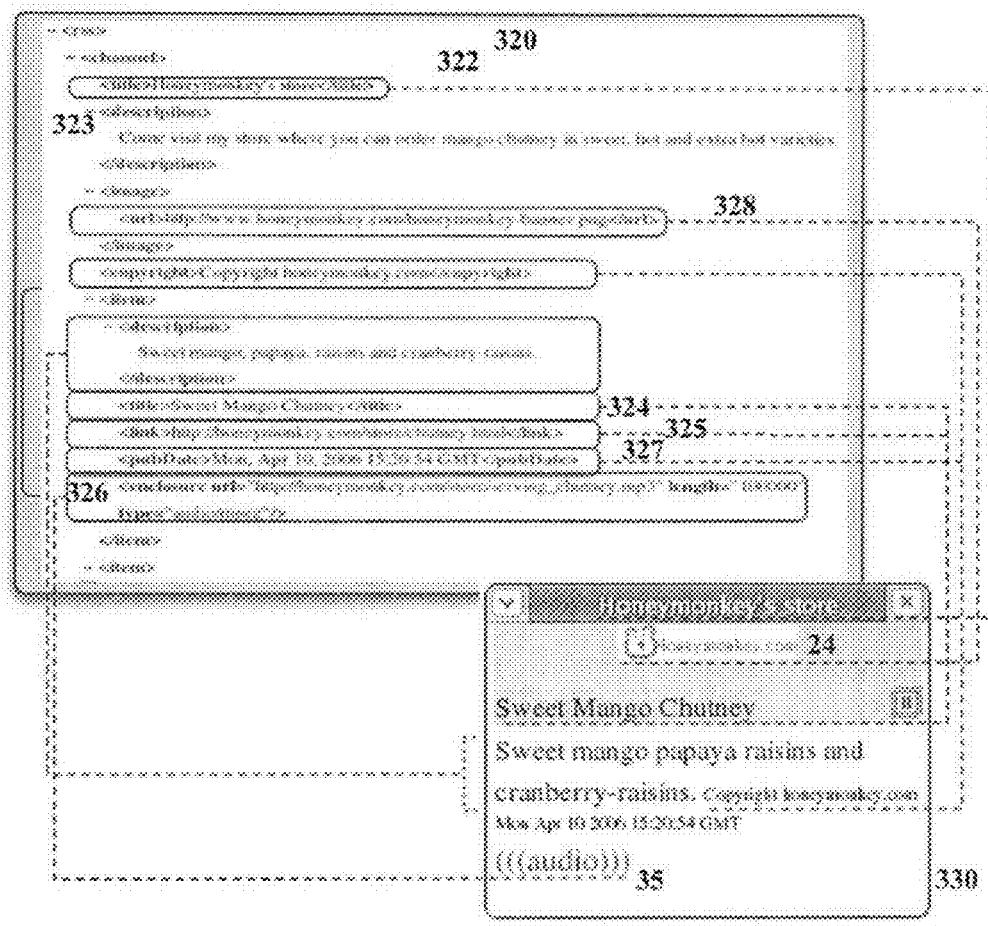
FIGS. 14A-B depict an XML source to player correspondence and an example of Extensible Stylesheet Language Transformations (XSLT transformations)

For example, as shown in FIG. 14A, the rss/image/url 328 is used as the banner image 14. The standard size of this image matches the banner layout, although some feed images do not. The rss/title 322 and rss/description 323 is used in the table of contents and the popup window title. The rss/item/title 324 and rss/item/link 325 is used in the title and its link for each item. The rss/item/description is used as the player content description, which may be augmented or superseded by other available tags, such as for an audio resource 326. The rss/item/author 327 and pubDate is used at the bottom of the contents to show the item's ownership. The rss/channel/item/enclosure 326 element can be used to produce a media link in a played item. If the type is audio, then an external audio player can be launched 35. If the type of video then an external video player can be launched, as examples.

Feed data, unlike a web page, is not usually formatted for user reading. The player often has to use a sensible layout to the data.

Referring to FIGS. 15A-H, the player can play content that is not in standard feed data. Images 342 and other media can be in a folder that is accessible as a URL in indexed format 340. The Player 346 reads the url's 340 web page HTML 347, and builds either a formal feed XML 320 from the HTML, or directly provides playable data for images.

Figure 15A:
FIGS. 15A-H are a series of diagrams useful for understand a Web folder player example

In FIG. 15A, shown is an image folder index page 340 and image Player 341. Shown in FIG. 15A is a web folder 340—a URL that displays an index 340 of images. This URL html is parsed by the player 346 to produce a playable set of images 47, without the need for an actual "feed" (file). (In FIG. 15H, this facility can be used to upload images from cell phone cameras 353 or desktops, and have a dynamic "feed" of images played without the need for editing or crafting a feed file.)

Figure 15B:

FIG. 15B shows standard indexed web folder html 347 generated from a web server. Images are used as an example here, but other media or documents can be used as well. Images can have supplemental files that to dynamically provide a played item. For example, an image file 342 (FIGS. 15C and 15D) has accompanying text 343 (or other document type) file that can be used to add descriptive text to the image shown. The text file could originate from various sources such as e-mail, text messaging, web form input, and so forth. Components of an item can be put together for display and interaction. The image file and a separate text (FIG. 15C) description file (FIG. 15D) are put together to form image and description item (FIG. 15G).

Figures 15C, 15D, 15E, 15F:
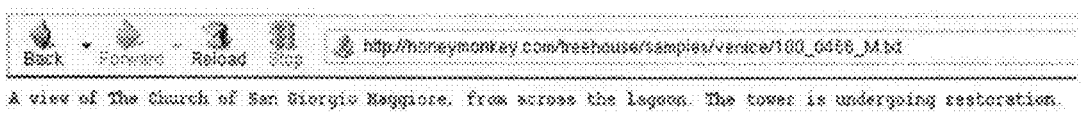
Figure 15G:
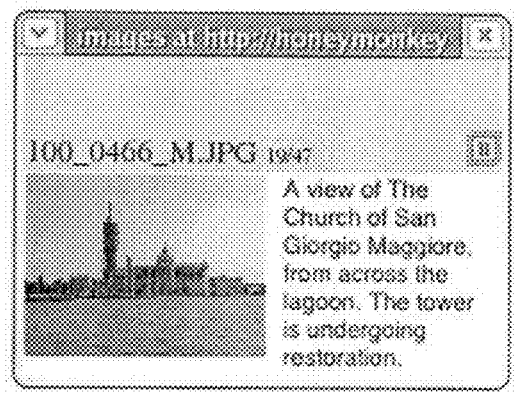

FIGS. 15E and 15F show an image 342 could have an accompanying xml 344 file that has tags for the item. These tags could specify parts of standard feed elements 345 or extended features such as those mentioned previously in the quick tools above. This additional information can provide a composite, dynamically provided dataset for the "item" when used (such as when played).

Enhancements to this dynamic playing include reading text 343, html, or xml 344 files for the webfolder or for each image (item) to provide information for each item. The webfolder is used as a dynamic ad-hoc database 349. Users post images 342 and other associated tagged or text 343 content into the folder, without any formatting or editing concerns. Players read and process this information into playable "feed-like" contents.

Figure 15H:
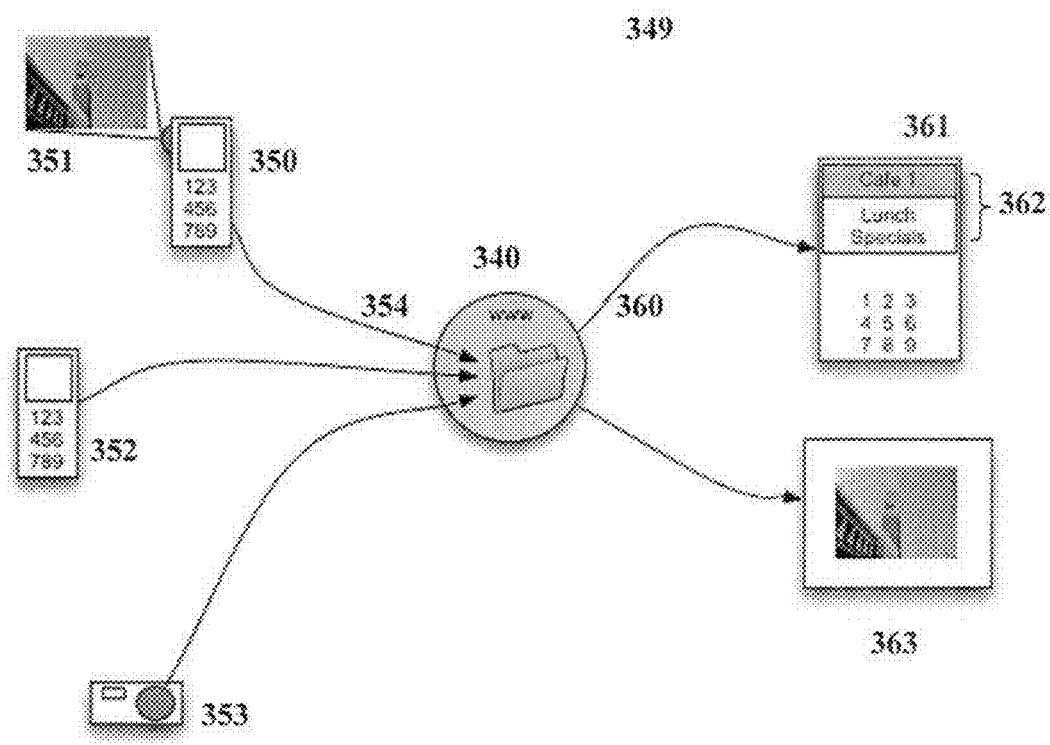

Referring to FIG. 15H, an example of posting 354 of cell-phone 350 images 351 and messages 352 to the web, and the use of this content as a played feed 362. Cell-phone originated information cannot support much editing or control, so posting 354 the content to the web and viewing the content using the player 362, 363 simplifies sharing. Various creators of content (images, texts, audio, video, etc) can come from some sources, mobile or fixed, and post content to a shared server 340, while other users, with the described player, can receive 360 dynamically up to date contents built from this ad-hoc feed.

Player Engine

Figure 16:
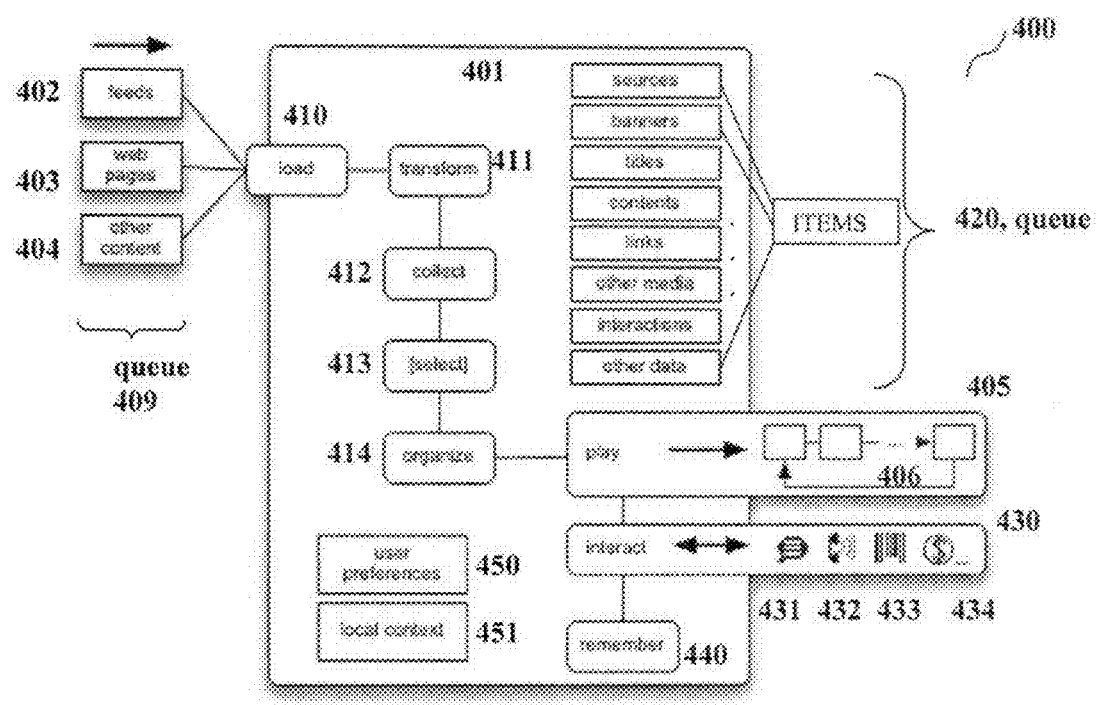
FIG. 16 is a block diagram of feed player "engine"

Referring to FIG. 16, features of a playable feed system 400 can be made into an "engine" 401, in software or hardware/software, and embedded into devices. The player engine accepts feeds 402, html pages 403, and other content 404 as input, and produces playable contents 405 with particular features and interactivity. The source information is loaded 410 and parsed (transformed) 411 into data and code components. Data are collected 412 and stored in a queue 420. The data includes information concerning the sources 420a, banners 420b, titles 420c, contents 420d, links 420e, media 420f, interactions 420g to provide for an item, and other data 420h. The queue 420 stores the content and related data for playback by the player 20 in an asynchronous manner, without the need for user interaction.

Queue 420 is shown organized by linked data structures of data types, e.g., sources 420a, banners 420b, titles 420c, contents 420d, links 420e, media 420f, interactions 420g to provide for an item, and other data 420h, with an item data type having links to the other data types stored in the queue. Other arrangements are possible. For instance, the queue can be organized by items in which each item's source, banner, title, content, links, media, permitted interactions provided for the item, as well as other data can be stored with and organized according to each item.

A subset is optionally selected 413, from the queue 420, based on criteria, either user defined or default criteria, e.g., number of players, number of feeds in each player, playback speed, etc. The content are organized 414 for playing 405. The player loops 406 through each item, either as individual or collective play-lists for playback in either one or multiple players. Each item can be interacted with 430, depending on the available and relevant interaction tools, such as commenting 431, or clipping 433. A history of played sources and interactions is maintained 440 for later recall.

Interactions can be made modular and loadable to support new interactions as they arise. Interaction tags (previously shown in FIG. 10G) are parsed and used by interaction modules. Display characteristics and transformation specifications can also be made modular to support new or custom attributes. User preferences 450 and local context 451 can be inputs into the engine via the device, to guide interactions and processing 410-414.

Site Playing

Figure 17:
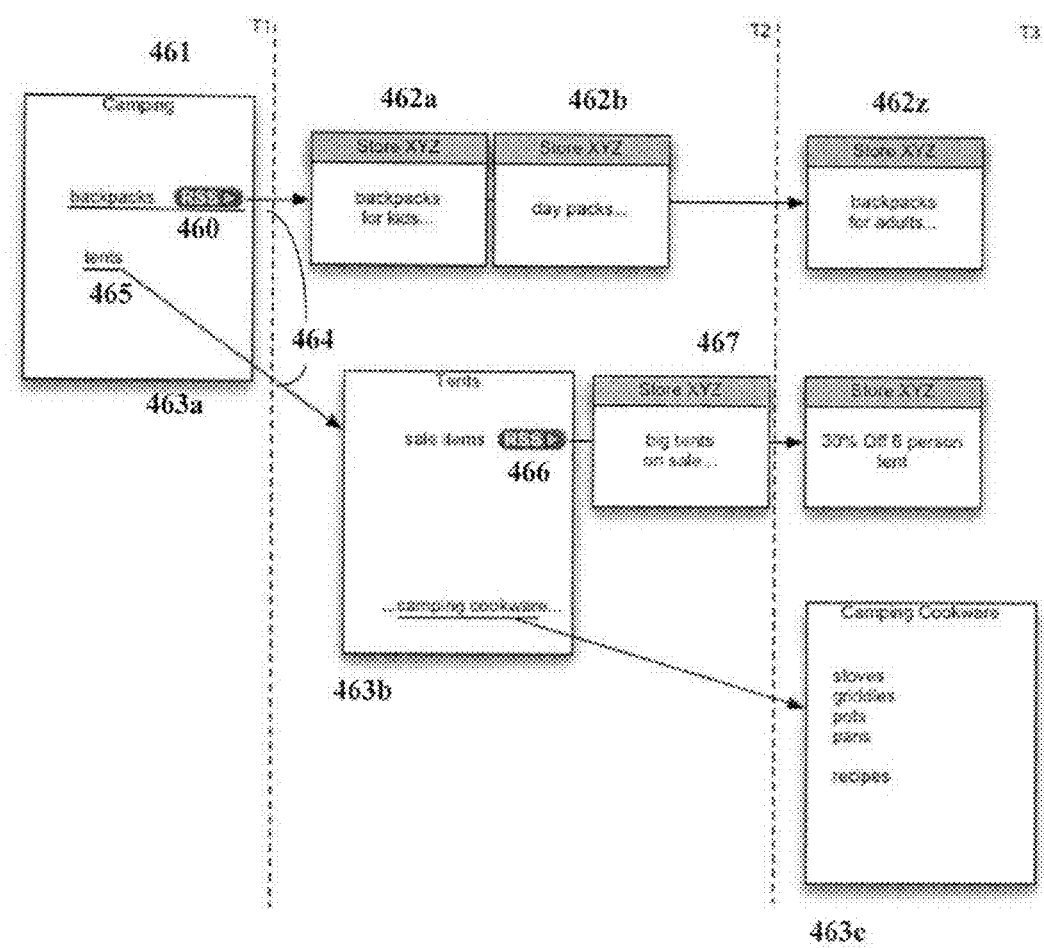
FIG. 17 is a diagrammatic web page browsing with embedded site-players

Referring to FIG. 17, the player can also be provided as a service to web sites 416. Such a service would allow websites to add links to their site to start feed players embedded within a page or as popups. Unlike the browser extension version 10 (FIG. 1), the site player would not require any special software installation on the client side, just a compatible browser.

"Site playing" allows websites to promote feed-based information directly to the user without the need for feed reader software. Use of the site player is interactive, e.g., the user can click 460 and get the played feed items 462. Browsing is changed from a sequential browsing of pages 463a,b,c, an asynchronous branching 464 and browsing of many pieces of information 462,463. This is advantageous to e-commerce sites in that users can receive site content (via players) even after the user has browsed away from a page or site. This increases the presence of the website for a user.

FIG. 17 shows a series of intervals, where the user is first on a page on "Camping" 463a. Selecting a feed link "backpacks" 460a launches a player 462a with information about backpacks. Products, helpful hints, and other items can be played in the launched player 462a. The user then clicks on the hyperlink from camping to "tents" 465. Even though the user has left the "camping" page 463a, the user still receives information about backpacks 462a plus the newly browsed page. The player 462a plus the newly loaded page 463b— backpacks and tents—provide complementary information to the user's browsing experience.

In this example, the user clicks further, to launch a feed on "sale items" 466, launching another player 467 showing sales. The user browses to "Camping Cookware" 463c. At the end of the example, the user now has 3 content streams in parallel: backpacks 462 player, sales 467 player, and camping cookware 463c page. The player information may or may not be coherent to each other—from the same site, it might be—however, each player is launched by the action of the user, and provides branched 464, asynchronous content to the user, who can close it at any time.

Computer kiosks provide information to people in places like public areas, transportation areas, stores, and offices. Feed playing can be used to provide kiosks with changing, dynamic content. Each kiosks in a place, such as a store, can be set to play particular feeds, based on where they are located and what people will see them. Since feed playing can be refreshed automatically, the contents can be kept new. Updating the feed source can cause all feed playing kiosks to reflect this change when they refresh. Interaction with feed items can be limited or altered for customer use.

Mobile Playing

Mobile devices (FIG. 7) are becoming more web-enabled. A player 80 within a mobile device 80 can provide sequentially played feed contents 84 and provide other features useful for mobile computing. Playing information on mobile devices opens up a multitude of possibilities for providing information to users via global (Internet) and local (wifi) connections 86. Playing content—products for sale 46, travel information 40, news 41, messages, etc.—is well suited for small devices where ability to control and pay attention to the device is a factor.

Playable Feed System

Figure 18:
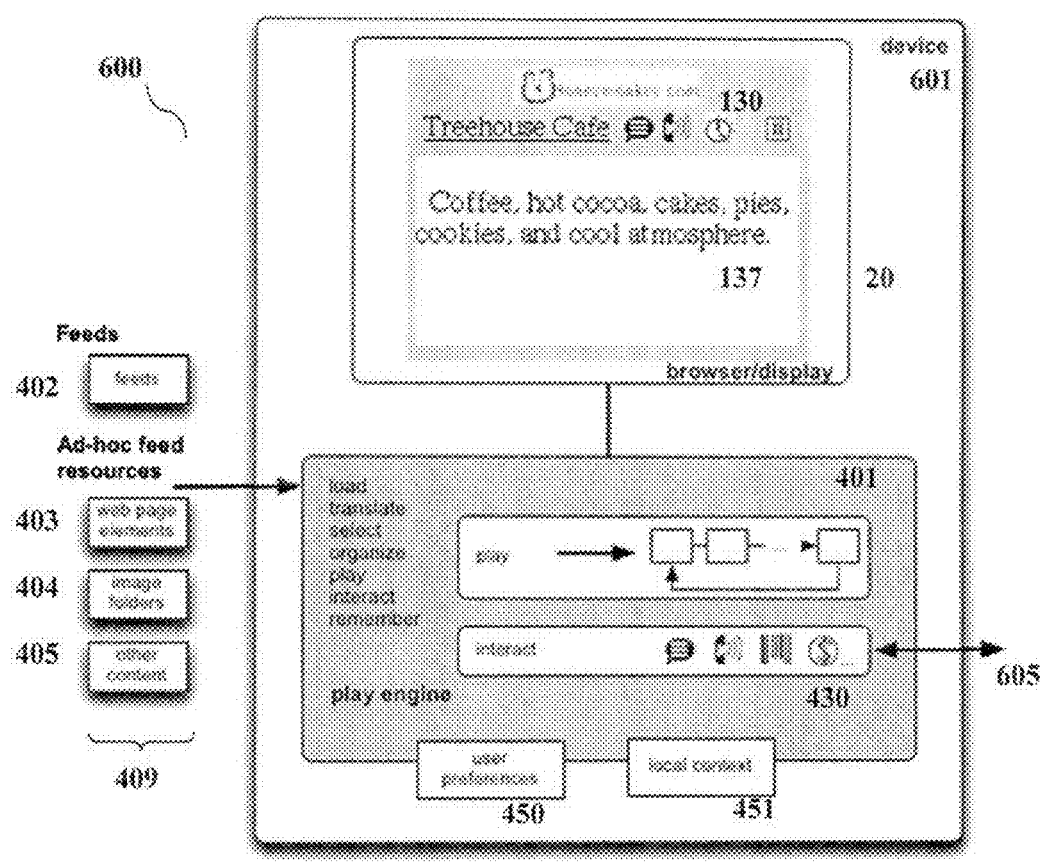
FIG. 18 is a diagram of play engine.

Referring to FIG. 18. shown is a system 600 including a device 601 with a play-engine 400, feed inputs. Feeds can either be formal feed data 402 or resources 403, 404, 405 used to build ad-hoc feeds. Interactive tools serve to bring interactivity 430 to individual items 409. The device has a browser type display 20 to show played items. The device can communicate with the external networked environment 605. Preferences 450 and contexts 451 of the device 601 and the play-engine 400 are connected.

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

One such type of computer includes a programmable processing system suitable for implementing or performing the apparatus or methods of the invention. The system includes a processor, a random access memory (RAM), a program memory (for example, a writable read-only memory such as a flash ROM), a hard drive controller and an input/output (I/O) controller coupled by a processor bus. The system can be preprogrammed, in ROM, for example, or it can be programmed (and reprogrammed) by loading a program from another source (for example, from a floppy disk, a CD-ROM, or another computer).

An execution environment includes computers running an operating system and browsers. Other environments could of course be used.

A number of embodiments of the invention have been described. Nevertheless, it will be understood that various modifications may be made without departing from the spirit and scope of the invention. Accordingly, other embodiments are within the scope of the following claims.

What is claimed is:

1. A system comprising:
a processor;
a display; and
a memory coupled to the processor for executing a computer program for producing and dynamic playback of one or more visual items of playable content that represent information parsed from one or more feeds, the computer program product comprises instructions to cause the processor to:
produce the one or more visual items of playable content from the one or more feeds, by instructions to:
convert information content from a given one of the one or more feeds into a specified mark-up language format;
apply parsing rules to parse the converted information content from the given feed into code functions and data elements to provide one or more datasets;
load a first one of the data elements and code functions into a player window of a player to render the one or more datasets into one of the produced visual playable content item, with a title of the given feed providing a title in a window portion of the one of the visual items of playable content, an image in the given feed displayed in the window, and information from the given feed summarized as a description of the given feed appearing in the window;
store the produced one of the visual items of playable content in a queue in a storage device;
manage the queue that includes the produced one of the visual items of playable content;
retrieve the one of the visual items of playable content according to criteria specified for playback of the one of the visual items of playable content; and
render on the display the retrieved one of the visual items of playable content in one or more of the windows.

2. The system of claim 1 wherein the player is a single or a set of simultaneous, asynchronous players that run on the system, each player having a player engine that retrieves the visual items of playable content in a sequence over a period of time, and which is regularly repeated, and with the period of time of the sequence and a repetition rate of the sequence being based on user defined parameters.

3. The system of claim 1 further comprising:
a set of interaction tools to facilitate interaction with the queued items, as the queued items are played, and to perform operations on the played item.

4. The system of claim wherein the interactions include at least one of to make comments, to purchase an item, to make a call, and to make a reservation.

5. The system of claim 1 wherein the player is integrated into a browser and is available at any time to load feeds during browsing.

6. The system of claim 1 wherein the player is a site-tool playing products on an e-commerce site.

7. The system of claim 1 wherein the player includes a player engine that includes a player control pad that further configures the system to launch:
a promo box that provides quick links to playable content, with the promo box including a link that when clicked on, causes the player to be immediately loaded.

8. The system of claim 7 wherein sponsored messages, links, and advertisement are shown in the promo box to generate revenue and providing additional content.

9. The system of claim 7 wherein the program comprises instructions that filter the type of information sent to the promo box, by user selection of one or more of location, time, audience, and activity.

10. A method executed on a device, the method comprises:
receiving by a processor in the device a plurality of ad-hoc feeds that are web-resource based feeds;
producing by the processor in the device one or more visual items of playable content from the received ad-hoc feeds by:
converting information content from a given one of the ad-hoc feeds into a specified mark-up language format;

applying parsing rules to parse the converted information content from the given ad-hoc feed into code functions and data elements to provide one or more datasets;
    loading a first one of the data elements and code functions into a player window of a player to render the one or more datasets into one of the produced visual items of playable content, with a title of the given ad-hoc feed providing a title in a given visual item of playable content window, an image in the ad-hoc feed displayed in the window, and information from the ad-hoc feed summarized as a description of the ad-hoc feed appearing in the window;
storing by the processor the produced one or more visual items of playable content in a computer storage;
dynamically playing the produced one or more visual items of playable content in the player, by:
    queuing selected visual items of the produced playable content for playback, with the visual items selected according to criteria specified for playback of the visual items of playable content; and
    rendering on a display the queued selected visual items of playable content in one or more windows by cycling through the queued selected visual items to play each visual item of playable content in a sequence that is regularly repeated with the sequence and a repetition rate of the sequence being based on user defined criteria.

11. A computer program product tangibly embodied on a computer readable storage device, the computer program product for playing content, the computer program product comprising instructions for causing a device to:
receive ad-hoc feeds;
produce one or more visual items of playable content from the received ad-hoc feeds by instructions to:
    convert information content from a given one of the ad-hoc feeds into a specified mark-up language format;
    apply parsing rules to parse the converted information content from the given ad-hoc feed into code functions and data elements to provide one or more datasets comprising one or more of image, text, audio and video portions of the given ad-hoc feed;
    load a first one of the data elements and code functions of the given ad-hoc feed into a player window of a player to render the one of more datasets into one of the produced visual items of playable content;
store the one or more produced visual items of playable content in a computer storage;
execute a player engine that plays the one or more visual items of playable content, as images parsed from the ad-hoc feeds, and rendered on a display device;
apply one or more user focus tools by a user to one of the visual items of playable content, rendered on the display device, the one or more user focus tools functionally selected according to at least one of context of the user, device and location of the device;
produce new content by application of the one or more user focus tools; and
cause the new content that results from applying the one or more user focus tools to be rendered on the display device with the rendered visual item.

12. The computer program product of claim 11 further comprising instructions to:
queue the produced visual items of playable content for playback in a sequence according to criteria specified for playback; and
customize the queued visual items of playable content by at least one property of location of the device, time of day, audience intended for the visual items, and activity engaged in by the user.

13. A system for dynamically playing information, the system comprises:
a processor;
a display; and
a memory coupled to the processor storing a player engine that configures the processor to:
    sequence visual items of playable content in a queue to play, with the sequenced visual items of playable content including components that were parsed from ad-hoc feeds into corresponding code functions and data elements to provide corresponding datasets, and which corresponding code functions and data elements are loaded into a player window of the player engine to render corresponding visual items of playable content, and with sequencing based on selection criteria;
    select visual items of playable content from the queue;
    render the selected visual items of playable content in a window on the display;
    apply one or more user focus operation tools by a user to one or more of the rendered visual items of playable content, with the one or more user focus operation tools applied being based on at least one of device context, characteristics of the one or more visual items of playable content, and user preferences specified for user focus operations;
    store new content resulting from the application of the one or more user focus operation tools to the one or more visual items of playable content; and
    render in a new player window the new content from applying the one or more user focus operation tools to the visual items of playable content.

14. The system of claim 13 wherein the player engine customizes display of the visual items of playable content by at least one property of topic, location of the device, time of day, audience intended for the visual items, and activity engaged in by the user.

15. A mobile device comprises:
a processor;
a memory coupled to the processor storing a computer program product that configures the processor to:
launch a player application to playback visual items of playable content in one or more player windows;
receive in the player application information feeds, the information feeds including web pages including web folders of images, text, and video data and ad hoc feeds including syndication feeds and podcast feeds;
convert information content from the information feeds into a specified mark-up language format;
apply parsing rules to parse the converted information content from the one or more feeds into code functions and data elements to provide one or more datasets comprising one or more of image, text, audio and video portions of the one or more feeds;
load a first one of the one or more data elements and code functions into a player window of a player application to render the one or more datasets into one or more of the produced visual items of playable content playable in the player application, where the visual items of playable content comprise one or more components that are text, audio, video, and/or images parsed from the information feeds;

store in a queue, the produced visual items of playable content;

render produced visual items of playable content during a playback mode of the player application;

apply one or more user focus operation tools by a user to one or more of the rendered visual items of playable content, with the one or more user focus operation tools applied being based on at least one of device context, characteristics of the one or more visual items of playable content, and user preferences specified for user focus operations;

store new content resulting from the application of the one or more user focus operation tools to the one or more visual items of playable content; and render in a new player window the new content from applying the one or more user focus operation tools to the visual items of playable content.

16. The device of claim 15 wherein the computer program further configures the processor to:

asynchronously playback the produced visual items of playable content stored in the queue in a player window of the launched player application, independently of a web browser window of a launched web browser application.

17. The device of claim 15 wherein the computer program further configures the processor to:

asynchronously playback plural ones of the produced visual items of playable content stored in the queue, in a corresponding plural number of player windows without a need for a user interaction.

18. The device of claim 15 wherein the instructions to apply parsing rules further configure the processor to:

apply XSLT (XML (Extensible Markup Language) Stylesheet Language for Transformations) parsing rules to convert the mark-up language format of an ad-hoc feed into XML format.

19. The device of claim 15 wherein the computer program further configures the processor to:

collect the produced visual items of playable content into a grouped set of produced visual items of playable content.

20. The device of claim 15 wherein the instructions to apply parsing rules comprises instructions to:

produce from the datasets information regarding sources of the information feeds, banners, titles, contents, links, media, and interactions provided for the received feeds.

21. The device of claim 15 wherein the computer program further configures the processor to:

select a subset of the produced visual items of playable content from the queue for playback.

22. The device of claim 21 wherein the computer program selects the subset based on one or more user defined criteria selected from groups consisting of location of the device, time of day, audience intended for the visual items, and activity engaged in by the user.

23. The device of claim 21 wherein the computer program selects the subset based on one or more default criteria that includes at least one of number of players, number of feeds played in each player, and a playback speed.

24. The device of claim 15 wherein the computer program further configures the processor to:

repeatedly play the stored visual items of playable content in the queue for playback in a single player window.

25. A mobile device comprises:

a processor;

a display in communication with the processor; and a memory coupled to the processor storing a player application that configures the processor to:

store in a queue in a computer storage on the device, visual items of playable content, with the queue organized by linked data structures of data types, and with the visual items of playable content including components that were parsed from structured and/or ad-hoc feeds into corresponding code functions and data elements to provide corresponding datasets, and which corresponding code functions and data elements are loaded into a player window of the player application to render the corresponding datasets into corresponding one or more of the visual items of playable content;

provide a set of player controls that control playback of the visual items of playable content;

play as a sequence the produced visual items of playable content on a display device in accordance with selections from the player controls; and in response to a user command from one or more of the player controls, provide a set of user interaction tools that enable a user to interact with the visual items of playable content during playback of the visual items of playable content, and through the user interaction tools produce new content; and associate the produced new content with the corresponding visual items of playable content.

26. The mobile device of claim 25, wherein the player controls include a pause control that causes the processor to pause playing of the visual items of playable content by the player application; and the program further configures the processor to:

provide a subset of the user interaction tools, the tools being tools that are relevant to the visual items paused by the player application, the subset of tools providing user interactions with the paused visual items of playable content.

27. The mobile device of claim 26 wherein one paused visual item of playable content is a product for sale, and the subset of tools includes at least one tool selected from a group consisting of a comment tool, a call tool, a transaction tool, and a coupon tool.

28. The mobile device of claim 25 wherein the user interactive tools are part of the visual items of playable content definition.

29. The mobile device of claim 25 wherein the user interactive tools are built into the player application.

30. The mobile device of claim 25 wherein a first one of the set of user interaction tools is a coupon tool, with the coupon tool providing a coupon related to the visual items of playable content, which is clipped and saved, with data for the coupon invoked by the coupon tool is embedded within one of the ad-hoc feeds that produced the particular items.

31. The mobile device of claim 25 wherein one or more of the visual items of playable content is paused in the display to provide a focused one or more of the visual items of playable content; and the processor configures the player application to:

retrieve data in the paused visual items; and apply the retrieved data to a user interactive tool, with the user interactive tool based on at least one factor selected from a group consisting of topic, location, time, audience and activity.

32. The mobile device of claim 25 wherein the user interactive tool is represented by an icon that is hyperlinked to a URL to provide the user interactive tool that is dynamically associated with the visual items in focus based on the device and the user context to offer the user relevant interactions with the visual items.

33. A mobile device comprises:
a processor;
a memory coupled to the processor storing a computer program product that configures the processor to:
launch a single player from a web page having plural feeds, the processor is further configured to:
detect feeds on the web page;
produce from the detected feeds visual items of playable content, by configuring the processor to:
apply parsing rules to parse one of the detected feeds on the web page into code functions and data elements to provide one or more datasets comprising one or more of image, text, audio and video portions of the one of the detected feeds;
load a first one of the data elements and code functions into a player window of a player to render the one or more datasets into one of the produced visual items of playable content;
store the one of the produced visual items of playable content in a queue in a computing storage on the device along with data that includes information related to the visual items of playable content including content type data;
retrieve from the queue in the computer storage on the device, for playback at least two different content types of the produced visual items of playable content the content types selected from a group consisting of tagged content converted into visual items of playable content, images, text, and feed links converted into visual items of playable content; and
repeatedly play the at least two, different retrieved content types in the single player in a sequence, as produced visual items of playable content that are rendered as images on a display device of the mobile device; and in response to a user command,
provide a set of user interaction tools that enable a user to interact with the produced visual items of playable content during playback to produce new content; and
associate the produced new content with the corresponding visual items.

34. The mobile device of claim 33, wherein the processor is configured to launch a single player with which the at least two different content types are played.

35. The mobile device of claim 33 wherein the processor is configured to:
parse the web page for content to detect a directory of feeds, particular tagged contents, images, and text.

36. The mobile device of claim 35, wherein tagged content is converted into the visual items of playable content using specific tags and patterns of tags and values on the web page of tagged content to identify content on the web page.

37. A mobile device comprises:
a display;
a processor;
a memory coupled to the processor storing a computer program product that configures the processor to:
retrieve from a queue in a computer storage on the device, sets of visual items of playable content, where the queue is organized by linked data structures of data types of components of information feeds that were parsed into the sets of the visual items of playable content from components of the information feeds into corresponding code functions and data elements to provide corresponding datasets, and which corresponding code functions and data elements are loaded into a player window of a player engine to render the corresponding datasets into a corresponding one or ones of the visual items of playable content, with the retrieved visual items displayed in a sequence for a time period that is regularly repeated until a user interaction or a new set is retrieved by the processor; and
render the retrieved one or more sets of visual items on a display device with the rendition of the retrieved visual items in the one or more sets rendered with a title parsed from a feed title in the information feed, a banner parsed from a feed image, and a description of the information feed; and
display the visual items in a sequence for a predetermined number of seconds receive a signal that pauses playback of the sequence;
receive an assertion of a user interaction tool from a set of user interaction tools that enable a user to interact with the paused sequence to apply a respective operation to one of the visual items of playable content in the paused sequence;
produce new content from the application of the user interaction tool;
associate the produced new content with the corresponding visual item of playable content; and
store the new content in the computing storage.

38. The mobile device of claim 37, wherein the processor is configured to:
repeatedly display the sequence of the visual items for the predetermined number of seconds.

39. The mobile device of claim 37, wherein the processor is configured to:
periodically retrieve from the queue a new set of the produced visual items of playable content based on a set refresh value; and
display the new set in another sequence for a time period.

40. The mobile device of claim 37, wherein the processor is configured to:
launch a web browser; and
at least one player is launched playing the visual items derived from at least one feed provided from the launch of the web browser.

41. The mobile device of claim 37, wherein the processor is configured to:
launch plural player applications, each player application playing a sequence of the visual items of playable content independently of others of the player applications.

42. The mobile device of claim 41, wherein the plural players play the visual items independent of the web browser, allowing the user to continue with conventional browsing, while also showing playing feed contents in a small, concise visual manner.

43. The mobile device of claim 37, wherein a single player is launched and renders a combined view of all visual items.

44. The mobile device of claim 37, wherein the visual items are played in a player that operates independently of a web browser and the visual items are played in parallel as a user browses various web sites.

45. A web server comprises:
a processor;
a memory in communication with the processor, the memory storing a computer program product that configures the processor to produce webpages, the webpages including links, with at least one of the links linked to code that generates a player, with the player comprising instructions to:

access content from a webpage generated by the web server;

apply parsing rules to parse the content from the webpage into code functions and data elements to provide one or more datasets comprising one or more of image, text, audio and video portions of the webpage;

load a first one of the data elements and code functions into a player window of a player to render the one or more datasets into a visual item of playable content;

store the visual item of playable content in a queue; and render the visual item of playable content that is stored in the queue and which is played asynchronously, with other visual items of playable content that are stored in the queue.

46. The web server of claim 45 wherein the player allows websites to promote feed-based information directly to a user without a need for a feed reader software.

47. The web server of claim 45 wherein the player is interactive permitting a user to select a feed and obtain playable feed items.

48. The web server of claim 45 wherein the player further comprises instructions to:

receive one or more ad-hoc feeds including syndication feeds and podcast feeds;

convert information content from one or more of the ad-hoc feeds into a specified mark-up language format;

apply parsing rules to parse the converted information content into code functions and data elements to provide one or more datasets comprising portions of the one or more ad-hoc feeds;

load a first one of the data elements and code functions into the player to render the one or more datasets into one of the produced visual items of playable content; and store the produced visual items of playable content in the queue.

49. The web server of claim 48 further comprises instructions to:

send to the player parsed pieces of content from the webpage after a user has browsed away from the webpage.

50. The web server of claim 48 further comprises instructions to:

add links to the web page to start the player embedded within the web page as a popup window.

51. A mobile device comprises:

a processor;

a memory coupled to the processor storing a computer program product that configures the processor to:

launch a web browser to a web page having an integrated extension in the web browser, launch a player application by selecting links that represent syndicated feeds on the web page by receiving data representing a user dragging and dropping one of the links from the syndicated feeds onto the integrated extension causing the player application to load;

process the dragged and dropped linked contents;

convert information content from one or more of the dragged and dropped linked content into a specified mark-up language format;

apply parsing rules to parse the converted information content into code functions and data elements to provide one or more datasets comprising portions of the dragged and dropped linked content;

load a first one of the data elements and code functions into a player window of the player application to render the one or more datasets into one of the produced visual items of playable content.

52. The mobile device of claim 51, wherein the integrated extension is represented as an icon on a toolbar.

53. The mobile device of claim 51, wherein the integrated extension is represented on a menu within the web browser.

54. The mobile device of claim 51, wherein the integrated extension is available during browsing to load and play feeds as the feeds are found.

55. The mobile device of claim 51, wherein the player application is provided as a small pop-up window.

56. The mobile device of claim 51, wherein the web pages includes links to feeds represented by icons on the web pages.

57. The mobile device of claim 51 wherein the program further configures the device to:

parse the feeds into data and code components; and produce from the data a representation of the visual items of playable content where a feed's title becomes the visual item of playable content window title, the feed's image becomes a banner in the visual item of playable content to recognize a source of the feed, and a description of the feed appears under the title in the visual item of playable content.

* * * * *